United States Patent
Hayakawa et al.

(10) Patent No.: US 6,825,280 B1
(45) Date of Patent: Nov. 30, 2004

(54) PROPYLENE BLOCK COPOLYMER AND PROPYLENE RESIN COMPOSITION

(75) Inventors: Yu Hayakawa, Yokkaichi (JP); Tsuyoshi Ogasawara, Yokkaichi (JP); Yuuji Fujita, Yokkaichi (JP); Masao Sakaizawa, Yokkaichi (JP); Kimiho Kosegaki, Tokyo-To (JP); Toshihiko Sugano, Yokkaichi (JP); Takao Tayano, Yokkaichi (JP); Toru Suzuki, Yokohama (JP); Yasuo Maruyama, Yokohama (JP); Osamu Shibata, Yokohama (JP); Takao Usami, Ibaraki-Ken (JP)

(73) Assignee: Japan Polychem Corporation, Tokyo (JP)

(*) Notice: Subject to any disclaimer, the term of this patent is extended or adjusted under 35 U.S.C. 154(b) by 0 days.

(21) Appl. No.: 09/485,189

(22) PCT Filed: Jun. 7, 1999

(86) PCT No.: PCT/JP99/03030

§ 371 (c)(1),
(2), (4) Date: Feb. 7, 2000

(87) PCT Pub. No.: WO99/64490

PCT Pub. Date: Dec. 16, 1999

(30) Foreign Application Priority Data

| Jun. 5, 1998 | (JP) | 10-158140 |
| Jun. 5, 1998 | (JP) | 10-158141 |
| Jun. 5, 1998 | (JP) | 10-158144 |
| Jun. 5, 1998 | (JP) | 10-158147 |
| Jun. 5, 1998 | (JP) | 10-158240 |
| Jun. 5, 1998 | (JP) | 10-158242 |
| Jun. 5, 1998 | (JP) | 10-158243 |
| Jun. 5, 1998 | (JP) | 10-158244 |
| Jun. 5, 1998 | (JP) | 10-158245 |
| Jun. 5, 1998 | (JP) | 10-158250 |

(51) Int. Cl.$^7$ ............................................. C08L 23/10
(52) U.S. Cl. ...................... 525/240; 525/88; 525/89; 528/396; 524/494; 524/394; 524/127; 524/349; 524/351; 524/312; 524/313; 524/86; 524/91
(58) Field of Search ........................ 525/240–242, 525/88; 526/160, 348; 528/396

(56) References Cited

U.S. PATENT DOCUMENTS

| 4,153,587 A | * | 5/1979 | Yui ........................... 260/23 H |
| 4,621,114 A | * | 11/1986 | Watanabe et al. ............ 524/451 |
| 4,820,772 A | * | 4/1989 | Goto et al. .................... 524/83 |
| 5,322,902 A | * | 6/1994 | Schreck et al. ............. 525/247 |
| 5,391,618 A | * | 2/1995 | Yamamoto et al. ........... 525/88 |
| 5,563,194 A | * | 10/1996 | Watanabe et al. ........... 524/117 |
| 5,891,946 A | * | 4/1999 | Nohara et al. .............. 524/427 |
| 5,914,363 A | * | 6/1999 | Sadatoshi et al. ........... 524/451 |
| 5,965,654 A | * | 10/1999 | Hirata et al. ................ 524/451 |
| 6,011,102 A | * | 1/2000 | Shimojo et al. ............. 524/451 |
| 6,034,177 A | * | 3/2000 | Sobajima et al. ............. 525/88 |
| 6,100,333 A | * | 8/2000 | Collina et al. .............. 525/191 |
| 6,156,836 A | * | 12/2000 | Iwanami et al. ............ 524/451 |
| 6,201,069 B1 | * | 3/2001 | Fukazawa et al. .......... 525/191 |
| 6,340,652 B1 | * | 1/2002 | Sugano et al. .............. 502/118 |

FOREIGN PATENT DOCUMENTS

| EP | 794 225 A1 | * | 3/1997 | ........... C08L/23/10 |
| EP | 0 791 630 A1 | * | 8/1997 | ........... C08L/53/00 |
| EP | 0 856 555 A1 | * | 8/1998 | ........... C08L/53/00 |
| EP | 926 195 A1 | * | 6/1999 | ........... C08L/53/02 |
| EP | 0 953 602 A1 | * | 11/1999 | ........... C08L/53/00 |
| JP | 8-157662 | * | 6/1996 | ........... C08L/23/12 |
| WO | WO 97/38033 A1 | * | 10/1997 | ........ C08F/297/08 |

OTHER PUBLICATIONS

"Comprehensive Polymer Science" Allen, G. and Bevington, J.C., Eds.;vol. 4. Pergamon Press: New York, 1989, pp. 378–380.*

Encyclopedia of Polymer Science and Engineering, 1986, vol. 6, p. 530.

A. Zambelli, et al., "Copolymerization of Ethylene with Propene in the Presence of Homegeneous Catalytic Systems Based on Group 4 Metallocenes and Methylalumoxane: Implications for the Reactivity Ratios on the Reaction Mechanism", Makromol. Chem., Rapid Commun., 1991, 12, 523–528.

* cited by examiner

Primary Examiner—David W. Wu
Assistant Examiner—Rip A Lee
(74) Attorney, Agent, or Firm—Oblon, Spivak, McClelland, Maier & Neustadt, P.C.

(57) ABSTRACT

Disclosed are a propylene polymer composition possessing excellent balance among rigidity and low warpage, resistance to deterioration caused by thermal oxidation during processing, weathering resistance, antistatic properties, and low bleeding properties, and a propylene resin composition which can easily produce molded products having excellent balance between rigidity and impact resistance (particularly low-temperature impact resistance) or heat resistance. The propylene polymer composition and the propylene resin composition comprise a propylene block copolymer consisting essentially of the following blocks (a) and (b) and having a melt flow rate of 0.1 to 200 g/10 min:

block (a): a polymer block of a homopolymer of propylene or a random copolymer of propylene with a comonomer selected from the group consisting of ethylene and $C_4$–$C_{20}$ α-olefins, the content of the comonomer being not more than 10% by mole; and block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (I)

$$n_b \leq n+1.5 \qquad (I)$$

wherein $n_b$ represents the average chain length of the comonomer block; and n represents the gross average chain length of the comonomer.

54 Claims, No Drawings

PROPYLENE BLOCK COPOLYMER AND PROPYLENE RESIN COMPOSITION

TECHNICAL FIELD

The present invention relates to a block copolymer comprising polypropylene and an ethylene-propylene copolymer, and more particularly to a block copolymer having good impact resistance.

The present invention further relates to a novel propylene polymer composition. More particularly, the present invention relates to a propylene polymer composition which has an excellent balance between rigidity and warpage properties, an excellent balance among hot processing properties, weathering resistance and low bleeding, and an excellent balance between antistatic properties and low bleeding, and a propylene resin composition which has an excellent balance among rigidity, impact resistance (particularly low-temperature impact resistance) and heat resistance and is useful as a material for injection molding, extrusion, or blow molding.

BACKGROUND ART

Propylene resin materials, such as polypropylene, have excellent moldability and rigidity and, at the same time, have excellent recycling properties and heat resistance. By virtue of these excellent properties, the propylene resin materials have been used in various types of molding, and, as with other resins such as vinyl chloride resin and polystyrene, have been utilized in a wide variety of applications, such as automobiles, domestic electric appliances, and industrial materials. These resin materials are generally molded by injection molding, extrusion, blow molding or the like, and the molded products thus obtained are utilized in the above applications.

In some cases, nucleating agents are added to a conventional polypropylene produced in the presence of a Ziegler catalyst to improve the rigidity. This, however, had a drawback that warpage is likely to occur in the product. An attempt to produce materials having no significant warpage has led to a limitation on the amount of the nucleating agent added. This has made it impossible to produce materials satisfying both the rigidity and low warpage requirements. Further, processing sometimes causes deterioration due to thermal oxidation, such as burning or increased MFR. This problem also has not hitherto been solved in the art. In some cases, light stabilizers are added to conventional polypropylene produced in the presence of a Ziegler catalyst in order to impart weathering resistance to the polypropylene. In this case, the light stabilizers are bled on the product, and this deteriorates the appearance of the product. On the other hand, an attempt to provide materials, which are less likely to cause bleeding, leads to a limitation on the type and amount of the light stabilisers added. For this reason, resin materials satisfying both the weathering resistance and low bleeding property requirements have not been proposed in the art.

Further, in the case of polypropylene produced in the presence of a Ziegler catalyst, antistatic agents are sometimes added from the viewpoint of imparting antistatic properties to the polypropylene. In this case, however, the antistatic agents are bled on the product, and this deteriorates the appearance of the product. On the other hand, an attempt to provide materials, which are less likely to cause bleeding, leads to a limitation on the type and amount of the antistatic agent added. For this reason, resin materials satisfying both the antistatic property and low bleeding property requirements have not been proposed in the art.

In recent years, there is a demand for a reduction in thickness and a reduction in weight of molded products, such as injection molded products, from the viewpoints of resource saving and energy saving. Also for polypropylene molding materials, various proposals have been made to improve the balance between rigidity and impact resistance to realize a reduction in thickness and a reduction in weight of the molded products.

For example, the use of a block copolymer produced by stepwise polymerizing propylene with ethylene or other olefin(s) to reduce the thickness and to reduce the weight is already known in the art. Further, a propylene block copolymer produced by polymerization in the presence of a catalyst system comprising a metallocene compound and a co-catalyst has recently been proposed as a polypropylene having improved low-temperature impact resistance and other properties (Japanese Patent Laid-Open Nos. 337308/1992, 202152/1993, and 206921/1994, Publication No. 510491/1996 of the Translation of International Patent Application, WO 95/27740, WO 95/27741 and the like). Further, the applicant of the present application also has proposed improved methods in the above catalyst system using a specific carrier and a specific polymerization method (Japanese Patent Laid-Open Nos. 172414/1994, 287257/1994, and 27237/1996).

Propylene block copolymers produced by these methods, however, do not always have a satisfactory balance among rigidity, impact strength (particularly low-temperature impact strength) and/or heat resistance, and a further improvement in this balance has been desired in the art.

Accordingly, it is an object of the present invention to provide a block copolymer having an excellent balance between rigidity and impact resistance, a propylene polymer composition having an excellent balance between rigidity and low warpage properties and having excellent resistance to deterioration caused by thermal oxidation during processing, weathering resistance, antistatic properties, and low bleeding properties, and a propylene resin composition which can easily yield molded products having an excellent balance among rigidity, impact resistance (particularly low-temperature impact resistance) and/or heat resistance.

DISCLOSURE OF THE INVENTION

Under the above circumstances, the present inventors have made extensive and intensive studies with a view to improving the rigidity and the impact strength and the balance among warpage properties, resistance to deterioration caused by thermal oxidation during processing, weathering resistance, antistatic properties, and low bleeding properties of polypropylene, and, as a result, have found that the use of a propylene block copolymer having a specific polymer structure and, in addition, the incorporation of specific additives can provide propylene polymer compositions having excellent rigidity and low warpage properties, resistance to deterioration caused by thermal oxidation, weathering resistance, antistatic properties, and low bleeding properties. This has led to the completion of the present invention. Further, as a result of extensive and intensive studies, the present inventors have found that the use of a propylene polymer having a specific polymer structure and specific additives can provide molded products having an excellent balance among rigidity, impact resistance (particularly low-temperature impact resistance) and heat resistance, which has led to the completion of the present invention.

Thus, according to the present invention, there are provided a propylene block copolymer consisting essentially of the following blocks (a) and (b) and having a melt flow rate (molecular weight index of polymer) of 0.1 to 200 g/10 min (this propylene block copolymer being hereinafter referred to simply as a "propylene block copolymer"), and a propylene polymer composition comprising: 100 parts by weight of the above propylene block copolymer; and 0.001 to 1 part by weight of at least one metal salt selected from the group consisting of 1) metal salts of aromatic phosphoric acids and 2) metal salts of aromatic or alicyclic carboxylic acids, 0.001 to 1 part by weight of at least one compound selected from the group consisting of 3) aromatic phosphoric ester compounds having a melting point of 50° C. or above and 4) hindered phenolic compounds, 0.001 to 1 part by weight of at least one compound selected from the group consisting of 5) hindered amine compounds, 6) triazole compounds, 7) benzophenone compounds, and 8) benzoate compounds, or 0.001 to 1 part by weight of at least one compound selected from the group consisting of 9) fatty acid glycerol esters and 10) fatty acid diethanol amide compounds:

block (a): a polymer block of a homopolymer of propylene or a random copolymer of propylene with a comonomer selected from the group consisting of ethylene and $C_4$–$C_2$, α-olefins, the content of the comonomer being not more than 10% by mole; and block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (I):

$$n_b \approx n+1.5 \quad (I)$$

wherein $n_b$ represents the average chain length of the comonomer block; and n represents the gross average chain length of the comonomer (this composition being hereinafter referred to as a "composition I").

Further, according to the present invention, there is provided a propylene resin composition comprising: (1) the above propylene block copolymer; and (2) an inorganic filler, the content of the propylene block copolymer being 20 to 99% by weight, the content of the inorganic filler being 1 to 80% by weight (this composition being hereinafter referred to as a "composition II").

Furthermore, according to the present invention, there is provided a propylene resin composition comprising, in addition to (1) the above propylene block copolymer and (2) the above inorganic filler, (3) an elastomer, the content of the propylene block copolymer being 10 to 98% by weight, the content of the inorganic filler being 1 to 80% by weight, the content of the elastomer being 1 to 89% by weight (this composition being hereinafter referred to as a "composition III").

Furthermore, according to the present invention, there is provided a propylene resin composition comprising, in addition to (1) the above propylene block copolymer and (2) the above inorganic filler, (3) a polypropylene resin produced in the presence of a Ziegler catalyst (hereinafter referred to as a "Ziegler polypropylene"), the content of the propylene block copolymer being 10 to 94% by weight, the content of the inorganic filler being 1 to 80% by weight, the content of the Ziegler polypropylene being 5 to 89% by weight (this composition being hereinafter referred to as a "composition IV").

Furthermore, according to the present invention, there is provided a propylene resin composition comprising, in addition to (1) the above propylene block copolymer and (2) the above inorganic filler, (3) an elastomer and (4) a polypropylene resin produced in the presence of a Ziegler catalyst, the content of the propylene block copolymer being 10 to 93% by weight, the content of the inorganic filler being 1 to 80% by weight, the content of the elastomer being 1 to 84% by weight, the content of the Ziegler polypropylene being 5 to 88% by weight (this composition being hereinafter referred to as a "composition V").

Furthermore, according to the present invention, there is provided a propylene resin composition comprising: (1) the above propylene block copolymer; and (2) an elastomer, the content of the propylene block copolymer being 10 to 99% by weight, the content of the elastomer being 1 to 90% by weight (this composition being hereinafter referred to as a "composition VI").

Furthermore, according to the present invention, there is provided a propylene resin composition comprising, in addition to (1) the above propylene block copolymer and (2) the above elastomer, (3) a polypropylene resin produced in the presence of a Ziegler catalyst, the content of the propylene block copolymer being 10 to 94% by weight, the content of the elastomer being 1 to 85% by weight, the content of the Ziegler polypropylene being 5 to 89% by weight (this composition being hereinafter referred to as a "composition VII").

Furthermore, according to the present invention, there is provided a propylene resin composition comprising: (1) the above propylene block copolymer; (2) a glass fiber; and (3) an unsaturated carboxylic acid-modified polypropylene, the content of the propylene block copolymer being 40 to 98% by weight, the content of the glass fiber being 1 to 50% by weight, the content of the unsaturated carboxylic acid-modified polypropylene being 0.1 to 10% by weight (this composition being hereinafter referred to as a "composition VIII").

Furthermore, according to the present invention, there is provided a propylene resin composition comprising, in addition to (1) the above propylene block copolymer, (2) the above glass fiber, and (3) the above unsaturated carboxylic acid-modified polypropylene, (4) an elastomer, the content of the propylene block copolymer being 10 to 97% by weight, the content of the glass fiber being 1 to 50% by weight, the content of the unsaturated carboxylic acid-modified polypropylene being 0.1 to 10% by weight, the content of the elastomer being 1 to 88% by weight (this composition being hereinafter referred to as a "composition IX").

Furthermore, according to the present invention, there is provided a propylene resin composition comprising, in addition to (1) the above propylene block copolymer, (2) the above glass fiber, and (3) the above unsaturated carboxylic acid-modified polypropylene, (4) a polypropylene resin produced in the presence of a Ziegler catalyst, the content of the propylene block copolymer being 10 to 93% by weight, the content of the glass fiber being 1 to 50% by weight, the content of the unsaturated carboxylic acid-modified polypropylene being 0.1 to 10% by weight, the content of the Ziegler polypropylene resin being 5 to 88% by weight (this composition being hereinafter referred to as a "composition X").

Furthermore, according to the present invention, there is provided a propylene resin composition comprising, in addition to (1) the above propylene block copolymer, (2) the above glass fiber, and (3) the above unsaturated carboxylic acid-modified polypropylene, (4) an elastomer and (5) a polypropylene resin produced in the presence of a Ziegler catalyst, the content of the propylene block copolymer being 10 to 92% by weight, the content of the glass fiber being 1 to 50% by weight, the content of the unsaturated carboxylic acid-modified polypropylene being 0.1 to 10% by weight, the content of the elastomer being 1 to 83% by weight, the content of the Ziegler polypropylene being 5 to 87% by weight (this composition being hereinafter referred to as a "composition XI").

Furthermore, according to the present invention, there is provided a propylene resin composition wherein, in any one of the above propylene resin compositions, the block (a) has a weight average molecular weight (Mw) of 10,000 to 1,000,000, a ratio of the weight average molecular weight (Mw) to the number average molecular weight (Mn), Mw/Mn, of not more than 6, an isotactic pentad chain fraction of not less than 95%, and a 1,3-regioirregular content of 0.02 to 3%.

Furthermore, according to the present invention, there is provided a propylene resin composition wherein in the above propylene resin composition, the propylene block copolymer has a melt flow rate of 4 to 200 g/10 min.

Furthermore, according to the present invention, there is provided a molded product of a propylene resin, selected from the group consisting of injection molded products, blow molded products, and extruded products, said molded product comprising any one of the compositions II to XI as a propylene resin composition.

The propylene resin compositions II to XI according to the present invention comprise a propylene block copolymer optionally compounded with an inorganic filler and/or an elastomer and, in some cases, a polypropylene resin produced in the presence of a Ziegler catalyst and/or an unsaturated carboxylic acid-modified polypropylene. In this case, when the propylene block copolymer contains, as a polymer block, a random copolymer satisfying a specific relationship between the block average chain length and the gross average chain length of the comonomer, it is possible to realize molding materials having an excellent balance among rigidity, impact resistance (particularly low-temperature impact resistance), and heat resistance.

Furthermore, according to the present invention, there are provided propylene resin compositions wherein, in propylene resin compositions II to XI, the above propylene block copolymer has been replaced with a propylene polymer satisfying the following requirements (a) to (c):

(a) the content of constituent units derived from propylene of 100 to 80% by mole and the content of constituent units derived from a comonomer of 0 to 20% by mole, the comonomer being selected from the group consisting of ethylene and α-olefins having 4 to 20 carbon atoms;

(b) the melt flow rate of 0.1 to 200 g/10 min; and (c) the average elution temperature of 75 to 120° C. and the degree of elusion dispersion of not more than 9.

Furthermore, according to the present invention, there are provided propylene resin compositions wherein, in the propylene resin compositions II to XI, the propylene polymer satisfies the following requirements (a) to (e):

(a) the content of constituent units derived from propylene of 100 to 94% by mole and the content of constituent units derived from a comonomer of 0 to 6% by mole, the comonomer being selected from the group consisting of ethylene and α-olefins having 4 to 20 carbon atoms;

(b) the melt flow rate of 0.1 to 200 g/10 min;

(c) the average elution temperature of 75 to 120° C. and the degree of elusion dispersion of not more than 9;

(d) the isotactic pentad chain fraction of not less than 95%; and (e) the 1,3-regioirregular content of 0.06 to 3%.

BEST MODE FOR CARRYING OUT THE INVENTION

The best mode for carrying out the present invention will be described.

The block copolymer according to the present invention is characterized by having as a whole a certain range of molecular weight and having a specific molecular structure in its EPR portion. The propylene resin composition according to the present invention comprises the specific propylene block copolymer or propylene polymer and an ingredient(s) compounded with the polymer.

(1) Propylene Block Copolymer

The propylene block copolymer according to the present invention consists essentially of the following blocks (a) and (b).

Here "propylene block copolymer consisting essentially of blocks (a) and (b)" used herein embraces a true "block copolymer," wherein at least one block (a) and at least one block (b) are present on a unit polymer chain of the block copolymer, and, in addition, a physical mixture of both the blocks which can be produced by successively carrying out polymerization steps for forming each block. Further, the propylene block copolymer according to the present invention does not exclude a block polymer or physical mixture of both the above blocks with a third block, other than both the above blocks, or a third component.

A typical or preferred example of the propylene block copolymer according to the present invention is such that one block (a) and one block (b) each are present on the unit polymer chain of the block copolymer. This propylene block copolymer is generally produced by two-stage polymerization, that is, by first producing the block (a) in the first stage polymerization and successively producing the block (b) in the second stage polymerization.

(i) Block (a)

Block (a) is a polymer block of a homopolymer of propylene or a random copolymer of propylene with a comonomer selected from the group consisting of ethylene and $C_4$–$C_{20}$ α-olefins. $C_4$–$C_{20}$ α-olefins usable in the random copolymer include 1-butene, 1-pentene, 1-hexene, 1-heptene, 1-octene, 3-methy-butene-1, and 4-methylpentene-1. The comonomer is preferably ethylene.

The content of the comonomer unit (comonomer content) in the whole constituent unit of the block (a) is not more than 10% by mole, preferably 0 to 5% by mole. When the comonomer composition of the block (a) is outside the above composition range, the rigidity is unsatisfactory.

The melt flow rate (hereinafter abbreviated to "MFR") of the block (a) is preferably 5 to 400 g/10 min. The MFR referred to in the present invention is measured according to JIS (Japanese Industrial Standards) K 7210 (230° C., load 2.16 kg).

The weight average molecular weight (Mw) of the block (a) is preferably 10,000 to 1,000,000, more preferably 50,000 to 800,000, still more preferably 100,000 to 400,000. When the weight average molecular weight of the block (a) is below the lower limit of the above weight average molecular weight range, the mechanical strength is deteriorated. On the other hand, when the weight average molecular weight is above the upper limit of the above weight average molecular weight range, the melt viscosity is increased in thermoplastic molding. This often makes it impossible to freely perform molding. The weight average molecular weight is measured by GPC (gel permeation chromatography).

More preferably, the ratio of the weight average molecular weight (Mw) to the number average molecular weight (Mn) (Mw/Mn), which is a molecular weight distribution index, not more than 6. When the molecular weight distribution is excessively broad and is above the upper limit of the above ratio range, the characteristic dispersion form referred to in the present invention is not sometimes realized.

Further, for the block (a), the isotactic pentad chain (mmmm) fraction (meso-pentad fraction), which is a stereotacticity index determined by $^{13}$C-NMR spectrum analysis according to a conventional method, is not less than 95%, preferably not less than 97%, and, at the same time, the 1,3-regioirregular content is preferably 0.02 to 3%. When the streotacticity is below the lower limit of the above meso-pentad fraction range, the melting point is likely to be lowered, leading to a deterioration in heat resistance. For some production processes, a minor amount of an atactic polymer component is present even in the case of a high average mmmm value. The atactic polymer component defined as a boiling heptane soluble fraction is preferably not more than 5%, more preferably not more than 3%, still more preferably not more than 1%.

The meso-pentad fraction is evaluated based on a $^{13}$C-NMR spectrum by a conventional method (Randall J. C., Journal Of Polymer Science, 12, 703 (1974). On the other hand, the 1,3-regioirregular content is quantitatively determined by determining the attribution of peaks according to A. Zambelli, Macromolecules, 21(3), 617 (1988) and calculating the content of the 1,3-regioirregular content in terms of % by mole from the total amounts of carbon of —CH$_2$— and —CH—.

(ii) Block (b)

Block (b) is a polymer block of a random copolymer of propylene with at least one comonomer selected from the group consisting of ethylene and $C_4$–$C_{20}$ α-olefins. $C_4$–$C_{20}$ α-olefins usable in the random copolymer include 1-butene, 1-pentene, 1-hexene, 1-heptene, 1-octene, 3-methy-butene-1, and 4-methylpentene-1. The comonomer is at least one member selected from the group consisting of ethylene and the α-olefins. Two or more comonomers may be contained as the constituent unit in the random copolymer. The comonomer is preferably ethylene.

In the block (b), the content of the comonomer is 10 to 80% by mole, preferably 25 to 75% by mole. Specifically, the comonomer is contained as the constituent unit in an amount of 10 to 80% by mole, preferably 25 to 75% by mole, based on the whole constituent unit of the block (b). When two or more comonomers are present, the total content of the comonomers is brought to 10 to 80% by mole.

For the comonomer, the gross average chain length, n, and the average chain length of block (b), $n_b$, should satisfy a relationship represented by formulation (I), preferably a relationship represented by formulation (II):

$$n_b \leq n+1.5 \quad \text{(I)}$$

$$n_b \leq n+1.2 \quad \text{(II)}$$

In this case, $n_b$ represents the average chain length of the comonomer block, that is, the average chain length of chains (comonomer blocks) each consisting of two or more comonomer units linked to each other or one another in the block (b). n represents the gross average chain length of the comonomer, that is, the average chain length of the whole chain including chains consisting of only one comonomer unit (chain length=1) in the block (b).

The block (b) may have any MFR so far as the MFR of the whole propylene block copolymer can be kept in a predetermined value range. The MFR, however, is preferably 0.01 to 3 g/10 min.

When the above formula relating to the average chain length of the block (b) is not satisfied, the impact resistance is unfavorably unsatisfactory.

For the random copolymer, the comonomer composition, the above-described various average chain lengths and the like may be determined by $^{13}$C-NMR. The determination method will be described by taking as an example a typical propylene block copolymer of a homopolymer of propylene as the block (a) and an ethylene-propylene random copolymer as the block (b).

For the measurement of $^{13}$C-NMR spectrum, several methods, which can ensure quantitative reliability, may be utilized. For example, a sample to be measured may be dissolved in o-dichlorobenzene of 120° C. to prepare a o-dichlorobenzene solution, followed by the measurement of the spectrum by the gated decoupling method wherein the waiting period is ten times the relaxation time ($T_1$). The above various average chain lengths of the block (b) may be determined in the following manner by using the notation of various methylene carbons, as described in G. J. Ray, P. E. Johnson and J. R. Knox, Macromolecules, 10, 773 (1977) or T. Usami, Y. Gotoh, H. Umemoto and S. Takayama, J. Appl. Polym. Scil.: Appl. Polym. Symp., 52, 145 (1993), and expressing the integrated intensity of each NMR signal as I. In the following numerical formula (Numerical formula 6), n represents the gross ethylene average chain length and $n_b$ represents the block ethylene average chain length.

[Total ethylene strength]=[Iββ+Iβδ$_+$+Iγγ+Iγδ$_+$+Iδ$_+$δ$_+$+(Iαγ+Iαδ$_+$)/2]/2 n=2 [Total ethylene strength]/(Iαγ+Iαδ$_+$)

[Block ethylene]=[Iβδ$_+$+Iγγ+Iγδ$_+$+Iδ$_+$δ$_+$+Iαδ$_+$/2]/2

(iii) Propylene Block Copolymer

The propylene block copolymer to be used in the present invention consists essentially of the block (a) and the block (b). The ratio of the block (a) to the block (b) in the block copolymer is preferably (a):(b)=50 to 95:50 to 5 (weight ratio), more preferably (a):(b)=65 to 95:35 to 5 (weight ratio).

The MFR of the whole propylene block copolymer is 0.1 to 200 g/10 min, preferably 1 to 200 g/10 min, more preferably 4 to 200 g/10 min. When the MFR is below the lower limit of the above MFR range, the fluidity is so low that the moldability is poor. Further, in this case, the dispersibility of the block (b) is also unfavorably deteriorated. On the other hand, when the MFR is above the upper limit of the above MFR range, the impact resistance is unsatisfactory.

The MFR referred to in the present invention is measured according to JIS K 7210 (230° C., load 2.16 kg), and is a molecular weight index of polymer. When the propylene block copolymer is produced by two-stage polymerization, the MFR of the block produced in the second stage (MFR in second stage) may be determined from the MFR of the propylene block copolymer (MFR of block copolymer), the MFR of the block produced in the first stage (MFR in first stage), and the amount (weight ratio) of polymer produced in each stage by the following equation:

log(*MFR* in block copolymer)−(content of first-stage polymer)×
log(*MFR* in first stage)=(content of second-stage polymer)×
log(*MFR* in second stage)

(iv) Production Process of Propylene Block Copolymer

The propylene block copolymer to be used in the present invention may be produced by any process without particular limitation so far as a predetermined block copolymer having properties specified in the present invention can be obtained. A representative production process of the propylene block copolymer according to the present invention will be described.

The propylene block copolymer according to the present invention may be produced by carrying out polymerization in at least two stages (polymerization step in the first stage being hereinafter often referred to as "first stage polymerization" with polymerization step in the second stage being hereinafter often referred to as "second stage polymerization") in the presence of a specific catalyst system.

[Catalyst]

The catalyst to be used in the present invention is a metallocene catalyst for the polymerization of an α-olefin, characterized by comprising indispensable components (A) and (B) and an optional component (C).

(A) Transition metal compound represented by formula [1].
(B) At least one compound selected from the group consisting of aluminumoxy compounds, ionic compounds, which, upon a reaction with the component (A), can convert the component (A) to a cation, Lewis acids, ion-exchangeable layered compounds excluding silicates, and inorganic silicates.
(C) Organoaluminum compounds.

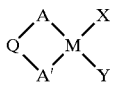
[1]

wherein A and A' each represent a conjugated five-membered ring ligand; Q represents a bonding group which crosslinks two conjugated five-membered ring ligands to each other at a desired position; M represents a metal atom selected from the group 4 to 6 atoms of the periodic table; and X and Y each represent a hydrogen atom, a halogen atom, a hydrocarbon group, an alkoxy group, an amino group, a phosphorus-containing hydrocarbon group, or a silicon-containing hydrocarbon group. A and A' may be the same or different in the same compound.

Component (A):

Specific examples of conjugated five-membered ring ligands (A and A') in transition metal compounds represented by formula [1] include conjugated hydrocarbon five-membered ring ligands, that is, cyclopentadienyl groups. Cyclopentadienyl groups include those having four hydrogen atoms (all bonding sites of carbon atoms, except for carbon atoms located in crosslinked portions, having hydrogen atoms: $C_5H_4$—) and derivatives thereof wherein several hydrogen atoms have been substituted by substituents.

Examples of substituents include hydrocarbon groups having 1 to 20 carbon atoms, preferably 1 to 12 carbon atoms. The hydrocarbon group may be bonded as a monovalent group to the cyclopentadienyl group. Alternatively, when a plurality of hydrocarbon groups are present, two of them may be bonded to each other at respective other ends (ω-ends) than the ends bonded to the cyclopentadienyl group and thus, together with a part of the cyclopentadienyl group, forms a ring.

Examples of the latter case include groups wherein two substituents are bonded to each other at their respective ω-ends and share two adjacent carbon atoms in the cyclopentadienyl group to form a condensed six-membered ring, that is, indenyl, tetrahydroindenyl and fluorenyl groups, and groups wherein two substituents are bonded to each other at their respective ω-ends and share two adjacent carbon atoms in the cyclopentadienyl group to form a condensed seven-membered ring, that is, azulenyl and tetrahydroazulenyl groups.

Specific examples of conjugated five-membered ring ligands represented by A and A' include substituted or unsubstituted cyclopentadienyl, indenyl, fluorenyl, and azulenyl groups.

Substituents on conjugated five-membered ring ligands, such as cyclopentadienyl group, include, in addition to the hydrocarbon groups having 1 to 20 carbon atoms, preferably 1 to 12 carbon atoms, described above, groups derived from halogen atoms, such as fluorine, chlorine, and bromine, $C_1$–$C_{12}$ alkoxy groups, silicon-containing hydrocarbon groups having 1 to 24 carbon atoms represented, for example, by —Si($R_1$)($R_2$)($R_3$), phosphorus-containing hydrocarbon groups having 1 to 18 carbon atoms represented, for example, by —P($R_1$)($R_2$), nitrogen-containing hydrocarbon groups having 1 to 18 carbon atoms represented, for example, by —N($R_1$)($R_2$), boron-containing hydrocarbon groups having 1 to 18 carbon atoms represented, for example, by —B($R_1$)($R_2$), and halogen-, oxygen-, nitrogen-, phosphorus-, sulfur-, boron-, or silicon-containing hydrocarbon groups having 1 to 20 carbon atoms, preferably 1 to 12 carbon atoms.

When a plurality of substituents of the type described above are present, they may be the same or different. $R_1$ to $R_3$ may be the same or different and each independently represents a hydrogen atom or a $C_1$–$C_{20}$ alkyl, alkenyl, or aryl group. Further, they may combine together to form a cyclic substituent.

Q represents a bonding group which crosslinks two conjugated five-membered ligands to each other at a desired position. Specific examples of Q include:

(i) alkylene groups having 1 to 20 carbon atoms, such as methylene, ethylene, isopropylene, phenyl methyl methylene, diphenyl methylene, and cyclohexylene groups;

(ii) silylene groups, such as silylene, dimethyl silylene, phenyl methyl silylene, diphenyl silylene, disilylene, and tetramethyl disilylene groups; and (iii) germanium-, phosphorus-, nitrogen-, boron-, or aluminum-containing hydrocarbon groups, more specifically groups represented by $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$, and $(CH_3O)Al$. Among them, alkylene, silylene, and germylene groups are preferred.

M represents a metal atom selected from group 4 to 6 atoms of the periodic table, preferably a group 4 atoms of the periodic table, and specific examples thereof include titanium, zirconium, and hafnium. Particularly preferred are zirconium and hafnium.

X and Y each independently represent a hydrogen or halogen atom, a hydrocarbon group having 1 to 20 carbon atoms, preferably 1 to 10 carbon atoms, an alkoxy group having 1 to 20 carbon atoms, preferably 1 to 10 carbon atoms, an amino group, a nitrogen-containing hydrocarbon group having 1 to 20 carbon atoms, preferably 1 to 10 carbon atoms, a phosphorus-containing hydrocarbon group having 1 to 20 carbon atoms, preferably 1 to 12 carbon atoms, such as a diphenylphosphine group, or a silicon-containing hydrocarbon group having 1 to 20 carbon atoms, preferably 1 to 12 carbon atoms, such as a trimethylsilyl or bis(trimethylsilyl)methyl group. X and Y may be the same or different. Among them, a halogen atom, a hydrocarbon group having 1 to 8 carbon atoms, and a nitrogen-containing hydrocarbon group having 1 to 12 carbon atoms are preferred.

In the catalyst for the polymerization of an olefin according to the present invention, among the compounds represented by formula [1], compounds having the following substituents are preferred as the component (A).

A, A'=cyclopentadienyl, n-butyl-cyclopentadienyl, indenyl, 2-methyl-indenyl, 2-methyl-4-phenylindenyl, tetrahydroindenyl, 2-methyl-tetrahydroindenyl, 2-methylbenzoindenyl, 2,4-dimethylazulenyl, 2-methyl-4-phenylazulenyl, 2-methyl-4-naphthylazulenyl, 2-ethyl-4-naphthylazulenyl, 2-ethyl-4-phenylazulenyl, or 2-methyl-4-(4-chlorophenyl)azulenyl.

Q=ethylene, dimethylsilylene, or isopropylidene.

M=a group 4 transition metal.

X, Y=chlorine, methyl, phenyl, benzyl, or diethylamino.

Particularly preferred are compounds having A, A'=2,4-dimethylazulenyl, 2-methyl-4-phenylazulenyl, 2-methyl-4-naphthylazulenyl, 2-ethyl-4-naphthylazulenyl, 2-ethyl-4-phenylazulenyl, 2-isopropyl-4-naphthylazulenyl, or 2-methyl-4-(4-chlorophenyl)azulenyl.

Specific examples of transition metal compounds are as follows. Transition metal compounds with Q=alkylene group include, for example, (1) methylenebis(2-methyl, 4-phenyl, 4-hydroazulenyl) zirconium dichloride,
(2) ethylenebis(2-methyl, 4-phenyl, 4-hydroazulenyl) zirconium dichloride,
(3) ethylenebis(2-methyl, 4-phenyl, 4-hydroazulenyl) zirconium hydride monochloride,
(4) ethylenebis(2-methyl, 4-phenyl, 4-hydroazulenyl) methylzirconium monochloride,
(5) ethylenebis(2-methyl, 4-phenyl, 4-hydroazulenyl) zirconium monomethoxide monochloride,
(6) ethylenebis(2-methyl, 4-phenyl, 4-hydroazulenyl) zirconium diethoxide,
(7) ethylenebis(2-methyl, 4-phenyl, 4-hydroazulenyl) zirconium dimethyl,
(8) ethylenebis(2-methylindenyl)zirconium dichloride,
(9) ethylenebis(2-methyl, 4,5,6,7-tetrahydroindenyl) zirconium dichloride,
(10) ethylenebis(2-ethylindenyl)zirconium dichloride,
(11) ethylenebis(2,4-dimethylindenyl)zirconium dichloride,
(12) ethylene(2,4-dimethylcyclopentadienyl)(3',5'-dimethylcyclopentadienyl) zirconium dichloride,
(13) ethylene(2-methyl-4-tert-butylcyclopentadienyl)(3'-tert-butyl-5'-methylcyclopentadienyl)-zirconium dichloride,
(14) ethylene(2,3,5-trimethylcyclopentadienyl) (2',4',5'-trimethylcyclopentadienyl)zirconium dichloride,
(15) ethylene-1,2-bis(4-indenyl)zirconium dichloride,
(16) ethylene-1,2-bis[4-(2,7-dimethylindenyl)]zirconium dichloride,
(17) ethylenebis(4-phenylindenyl)zirconium dichloride,
(18) ethylenebis[1,1'-(4-hydroazulenyl)]zirconium dichloride,
(19) ethylenebis[1,1'-(2-ethyl, 4-phenyl, 4-hydroazulenyl)]zirconium dichloride,
(20) ethylenebis[1,1'-(2-methyl, 4-(4-chlorophenyl), 4-hydroazulenyl)]zirconium dichloride,
(21) ethylenebis(9-bicyclo[8.3.0]trideca-2-methyl-pentaenyl)zirconium dichloride,
(22) ethylene(1-indenyl)[1-(4-hydroazulenyl)] zirconium dichloride,
(23) isopropylidenebis(2-methyl, 4-phenyl, 4-hydroazulenyl)zirconium dichloride,
(24) isopropylidene(2,4-dimethylcyclopentadienyl) (3',5'-dimethylcyclopentadienyl)zirconium dichloride, and
(25) isopropylidene(2-methyl-4-tert-butylcyclopentadienyl)(3'-tert-butyl-5-methylcyclopentadienyl) zirconium dichloride.

Transition metal compounds with Q=silylene group include, for example, (1) dimethylsilylenebis(2-methylindenyl)zirconium dichloride,
(2) dimethylsilylenebis(2-methyl, 4,5,6,7-tetrahydroindenyl)zirconium dichloride,
(3) dimethylsilylenebis(2-methyl-4,5-benzoindenyl) zirconium dichloride,
(4) dimethylsilylenebis(2-methyl, 4-phenyl-indenyl) zirconium dichloride,
(5) dimethylsilylenebis(2,4-dimethylazulenyl) zirconium dichloride,
(6) dimethylsilylenebis(2-methyl-4, phenyl, 4,5,6,7,8-pentahydroazulenyl)zirconium dichloride,
(7) dimethylsilylene(2,4-dimethylcyclopentadienyl) (3',5'-dimethylcyclopentadienyl)zirconium dichloride,
(8) dimethylsilylenebis(2-ethyl, 4-phenyl, 4-hydroazulenyl)zirconium dichloride,
(9) dimethylsilylenebis(2-methyl-4,4-dimethyl-4,5,6,7-tetrahydro-4-silaindenyl)zirconium dichloride,
(10) dimethylsilylenebis[4-(2-phenylindenyl)] zirconium dichloride,
(11) dimethylsilylenebis[4-(2-tert-butylindenyl)] zirconium dichloride,
(12) dimethylsilylenebis[4-(1-phenyl-3-methyl-indenyl)] zirconium dichloride,
(13) dimethylsilylenebis[4-(2-phenyl-3-methylindenyl)] zirconium dichloride,
(14) phenylmethylsilylenebis(2-methyl-4-phenyl, 4-hydroazulenyl)zirconium dichloride,
(15) phenylmethylsilylenebis(2-methyl-4-phenyl, 4,5,6,7,8-pentahydroazulenyl)zirconium dichloride,
(16) phenylmethylsilylene(2,4-dimethylcyclopentadienyl)(3',5'-dimethylcyclopentadienyl)zirconium dichloride,
(17) diphenylsilylenebis(2-methyl-4-phenyl, 4-hydroazulenyl)zirconium dichloride,
(18) tetramethyldisilylenebis(2-methyl-4-phenyl, 4-hydroazulenyl)zirconium dichloride,
(19) dimethylsilylenebis[1,1'-(2-isopropyl, 4-phenyl, 4-hydroazulenyl)]zirconium dichloride,
(20) dimethylsilylenebis[1,1'-(2-ethyl, 4-naphthyl, 4-hydroazulenyl)]zirconium dichloride,
(21) dimethylsilylenebis[1,1'-{2-methyl-4-(4-chlorophenyl), 4-hydroazulenyl}]zirconium dichloride,

(22) dimethylsilylenebis(9-bicyclo[8.3.0]trideca-2-methylpentaenyl)zirconium dichloride, and

(23) (methyl)(phenyl)silylenebis{1,1'-(2-methyl-4-hydroazulenyl)}zirconium dichloride.

Transition metal compounds with Q=germanium-, phosphorus-, nitrogen-, boron-, or aluminum-containing hydrocarbon group include, for example, (1) dimethylgermaniumbis(2-methyl-4-phenyl, 4-hydroazulenyl)zirconium dichloride, (2) methylaluminumbis(2-methyl-4-phenyl, 4-hydroazulenyl)zirconium dichloride, (3) phenylaluminumbis(2-methyl-4-phenylazulenyl) zirconium dichloride, (4) phenylphosphinobis(2-methyl-4-phenyl, 4-hydroazulenyl)zirconium dichloride, (5) ethylboranobis(2-methyl-4-phenylazulenyl) zirconium dichloride, and (6) phenylaminobis(2-methyl-4-phenyl, 4-hydroazulenyl) zirconium dichloride.

Further, compounds are also usable wherein chlorine in the above compounds has been replaced with bromine, iodine, hydride, methyl, phenyl or the like. Further, according to the present invention, it is possible to use, as the component (A), compounds wherein the central metal in the zirconium compounds exemplified above has been replaced with titanium, hafnium, niobium, molybdenum, tungsten or the like.

Among them, zirconium, hafnium, and titanium compounds are preferred. More preferred are zirconium and hafnium compounds. Two or more of these compounds may be used in combination as the component (A). Further, the component (A) may be newly added at the end of the polymerization in the first stage or before the initiation of the polymerization in the second stage.

Component (B):

The component (B) as the catalyst component to be used in the present invention is at least one compound selected from the group consisting of aluminumoxy compounds, ionic compounds, which, upon a reaction with the component (A), can convert the component (A) to a cation, Lewis acids, ion-exchangeable layered compounds excluding silicates, and inorganic silicates. In this connection, some Lewis acids may also be regarded as ionic compounds which, upon a reaction with the component (A), can convert the component (A) to a cation. Thus, compounds belonging to both the Lewis acid and the ionic compound may be construed as belonging to any one of the Lewis acid and the ionic compound.

Specific examples of aluminumoxy compounds include compounds represented by formulae [2], [3] or [4]:

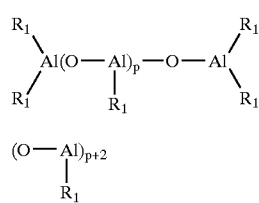

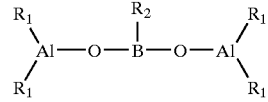

wherein $R_1$'s represent a hydrogen atom or a hydrocarbon residue, preferably a hydrocarbon residue having 1 to 10 carbon atoms, particularly preferably 1 to 6 carbon atoms, provided that the plurality of $R_1$'s may be the same or different; and p is an integer of 0 to 40, preferably 2 to 30.

Compounds represented by formulae [2] and [3] are compounds known also as alumoxanes, and may be produced by reacting one trialkylaluminum or two or more trialkylaluminums with water. Specific examples thereof include: (a) alumoxanes obtained from one trialkylaluminum and water, such as methylalumoxane, ethylalumoxane, propylalumoxane, butylalumoxane, and isobutylalumoxane; and (b) alumoxanes obtained from two trialkylaluminums and water, such as methylethylalumoxane, methylbutylalumoxane, and methylisobutylalumoxane. Among them, methylalumoxane and methylisobutylalumoxane are preferred.

These alumoxanes may be used in combination of two or more. The above alumoxanes may be prepared under various conventional conditions.

Compounds represented by formula [4] may be produced by reacting one trialkylaluminum or two or more trialkylaluminums and an alkylboronic acid represented by formula [5] in a molar ratio of the trialkylaluminum to the alkylboronic acid of 10:1 to 1:1. In formula [5], $R_3$ represents a hydrocarbon residue or halogenated hydrocarbon group having 1 to 10 carbon atoms, preferably 1 to 6 carbon atoms.

$$R_3-B-(OH)_2 \qquad [5]$$

Specific examples of compounds represented by formula [4] include the following reaction compounds:

(a) a product of a 2:1 reaction of trimethylaluminum and methylboronic acid;

(b) a product of a 2:1 reaction of triisobutylaluminum and methylboronic acid;

(c) a product of a 1:1:1 reaction of trimethylaluminum, triisobutylaluminum, and methylboronic acid;

(d) a product of a 2:1 reaction of trimethylaluminum and ethylboronic acid; and (e) a product of a 2:1 reaction of triethylaluminum and butylboronic acid.

Ionic compounds, which, upon a reaction with the component (A), can convert the component (A) to a cation, include compounds represented by formula [6]:

$$[K]^{e+}[Z]^{e-} \qquad [6]$$

In formula [6], K represents a cation component, and examples thereof include carbonium, tropylium, ammonium, oxonium, sulfonium, and phosphonium cations. Additional examples thereof include cations of metals and organometals that, in themselves, are likely to be reduced.

Specific examples of cations noted above include triphenylcarbonium, diphenylcarbonium, cycloheptatrienium, indenium, triethylammonium, tripropylammonium, tributylammonium, N,N-dimethylanilinium, dipropylammonium, dicyclohexylammonium, triphenylphosphonium, trimethylphosphonium, tris(dimethylphenyl)phosphonium, tris(methylphenyl)phosphonium, triphenylsulfonium, triphenyloxonium, triethyloxonium, pyrylium, silver ions, gold ions, platinum ions, copper ions, palladium ion, mercury ions, and ferrocenium ions.

In the general formula [6], Z represents an anion component which serves as a counter anion (generally not coordinated) against a cation species converted from the component [A]. Examples of Z usable herein include organoboron compound anions, organoaluminum compound anions, organogallium compound anions, organophosphorus compound anions, organoarsenic compound anions, and organoantimony compound anions. Specific examples thereof include:

(a) tetraphenylborate, tetrakis(3,4,5-trifluoro-phenyl) borate, tetrakis{3,5-bis(trifluoromethyl)phenyl} borate, tetrakis{3,5-di(t-butyl)phenyl}borate, and tetrakis (pentafluorophenyl)borate;

(b) tetraphenylaluminate, tetrakis(3,4,5-trifluoro-phenyl) aluminate, tetrakis{3,5-bis(trifluoromethyl)-phenyl}aluminate, tetrakis(3,5-di(t-butyl)phenyl) aluminate, and tetrakis(pentafluorophenyl)aluminate;

(c) tetraphenylgallium, tetrakis(3,4,5-trifluoro-phenyl) gallium, tetrakis{3,5-bis(trifluoromethyl)phenyl} gallium, tetrakis(3,5-di(t-butyl)phenyl)gallium, and tetrakis(pentafluorophenyl)gallium;

(d) tetraphenyl phosphorus and tetrakis (pentafluorophenyl phosphorus;

(e) tetraphenylarsenic and tetrakis(pentafluorophenyl) arsenic;

(f) tetraphenyl antimony and tetrakis(penta-fluorophenyl) antimony; and (g) decaborate, undecaborate, carbadodecaborate, and decachlorodecaborate.

Various organoboran compounds, metal halide compounds, solid acids and the like may be exemplified as Lewis acids, particularly Lewis acids which can convert the component [A] to a cation. Specific examples thereof include:

(a) organoboran compounds, such as triphenylboran, tris (3,5-difluorophenyl)boran, and tris(pentafluorophenyl) boran;

(b) metal halides, such as aluminum chloride, aluminum bromide, aluminum iodide, magnesium chloride, magnesium bromide, magnesium iodide, magnesium chlorobromide, magnesium chloroiodide, magnesium bromoiodide, magnesium chloride hydride, magnesium chloride hydroxide, magnesium bromide hydroxide, magnesium chloride alkoxide, and magnesium bromide alkoxide; and (c) solid acids, such as alumina and silica-alumina.

The ion-exchangeable layered compounds excluding silicates are compounds having a crystal structure such that planes constituted by ion bonds or the like are parallelly stacked on top of one another by weak bonding force and ions contained therein are exchangeable.

Ionic crystalline compounds having hexagonal closed packing type, antimony type, $CdCl_2$ type, $CdI_2$ type and other layered crystal structures may be exemplified as the ion-exchangeable layered compounds excluding silicates. Specific examples of ion-exchangeable layered compounds having such crystal structures include crystalline acid salts of polyvalent metals, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2$, α-$Ti(HAsO_4)_2 \cdot H_2O$, α-$Sn(HPO_4)_2 \cdot H_2O$, γ-$Zr(HPO_4)_2$, γ-$Ti(HPO_4)2$, and γ-$Ti(NH_4PO_4)_2 \cdot H_2O$.

Inorganic silicates include clay, clay minerals, zeolite, and diatomaceous earth. These may be either artificially synthesized products or naturally occurring minerals.

Specific examples of clays and clay minerals include: the family of allophanes, such as allophane; the family of kaolins, such as dickite, nacrite, kaolinite, and anauxite; the family of halloysites, such as metahalloysite and halloysite; the family of serpentinites, such as chrysotile, rizaldite, and antigorite; the family of smectites, such as montmorillonite, sauconite, beidellite, nontronite, saponite, and hectorite; vermiculite minerals, such as vermiculite; mica minerals, such as illite, sericite, and glauconite; attapulgite; sepiolite; palygorskite; bentonite; kibushi clay; gairome clay; hisingerite; pyrophyllite; and a group of chlorites. They may form a mixed layer.

Artificially synthesized products include synthetic mica, synthetic hectorite, synthetic saponite, and synthetic taeniolite.

Among these specific examples of clays and clay minerals, preferred clays and clay minerals are the family of kaolins, such as dickite, nacrite, kaolinite, and anauxite; the family of halloysites, such as metahalloysite and halloysite; the family of serpentinites, such as chrysotile, rizaldite, and antigorite; the family of smectites, such as montmorillonite, sauconite, beidellite, nontronite, saponite, and hectorite; vermiculites minerals, such as vermiculite; mica minerals, such as illite, sericite, and glauconite; synthetic micas; synthetic hectorite; synthetic saponite, and synthetic taeniolite. Particularly preferred are: the family of smectites, such as montmorillonite, sauconite, beidellite, nontronite, saponite, and hectorite; vermiculite minerals, such as vermiculite; synthetic micas; synthetic hectorit; synthetic saponite; and synthetic taeniolite. They may be used either as such without any particular treatment or after ball milling, sieving or other treatment. Further, they may be used alone or a mixture of two or more.

Salt treatment and/or acid treatment of the ion-exchangeable layered compounds and the inorganic silicates can vary the acid strength of the solid. In the salt treatment, the formation of ionic composites, molecule composites, organic derivatives or the like can vary the surface area and the interplanar spacng. Specifically, replacement of exchangeable ions between layers with different large bulky ions through the utilization of the ion exchangeability can provide a layered material with increased interplanar spacng.

In compounds not subjected to the above pretreatment, exchangeable metal cations contained therein are preferably ion exchanged with cations dissociated from the following salt and/or acid.

The salt used in the ion exchange is a compound containing a cation having at least one atom selected from the group consisting of group 1 to 14 atoms, preferably a compound composed of a cation having at least one atom selected from the group consisting of group 1 to 14 atoms and an anion derived from at least one atom or atomic group selected from the group consisting of halogen atoms, inorganic acids, and organic acids, more preferably a compound composed of a cation having at least one atom selected from the group consisting of group 2 to 14 atoms and at least one anion selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH, and $OOCCH_2CH_3$. Two or more of them may be simultaneously used.

An acid used in the ion exchange is preferably selected from hydrochloric acid, sulfuric acid, nitric acid, acetic acid, and oxalic acid. Two or more of them may be simultaneously used. Methods usable in the practice of the salt treatment in combination with the acid treatment include: one wherein the acid treatment is carried out after the salt treatment; one wherein the salt treatment is carried out after the acid treatment; one wherein the salt treatment and the acid treatment are simultaneously carried out; and one wherein, after the acid treatment, the salt treatment and the acid treatment are simultaneously carried out. The acid treatment can realize ion exchange and the removal of impurities present on the surface and, in addition, can elute a part of cations of aluminum, iron, magnesium, lithium and the like in the crystal structure.

Conditions for the treatment with the salt and the treatment with the acid are not particularly limited. In general, however, preferably, treatment conditions are selected so that the salt and acid concentrations are 0.1 to 30% by weight, the treatment temperature is room temperature to the boiling point of the solvent used, and the treatment time is 5 min to 24 hr, and the treatment is carried out so that at least a part of the compound treated is eluted. The salt and the acid each are generally used in the form of an aqueous solution.

When the salt treatment and/or the acid treatment are carried out, the control of the shape may be carried out by grinding, granulation or the like before, during, or after the treatment. Further, the shape control may be carried out in combination with other chemical treatment, such as alkali treatment or organic material treatment. For the component (B) thus obtained, the volume of pores having a radius of not less than 20 Å is preferably not less than 0.1 cc/g, particularly preferably 0.3 to 5 cc/g, as measured by mercury porosimetry. Clay and clay minerals generally contain adsorbed water and water between layers. The term "adsorbed water" used herein refers to water adsorbed on the surface of ion-exchangeable layered compound or the inorganic silicate or the fractured surface of the crystal, and the term "water between layers" refers to water which is present between layers of the crystal.

According to the present invention, preferably, the clay and the clay minerals are used after the removal of the adsorbed water and the water present between layers. The adsorbed water and the water present between layers may be removed by any heat treatment method without particular limitation, and examples of heat treatment methods usable herein include heat dehydration, heat dehydration while passage of a gas, heat dehydration under reduced pressure, and azeotropic dehydration with an organic solvent. The heating is carried out in such a temperature range that the presence of absorbed water and water between layers can be avoided. This temperature is generally 100° C. or above, preferably 150° C. or above. In this case, heating at such a high temperature as will cause breaking of the structure is unfavorable. The heating time is not less than 0.5 hr, preferably not less than one hr. In this case, the weight loss of the component (B) upon the dehydration drying is preferably not more than 3% by weight, assuming that suction has been carried out under conditions of temperature 200° C. and pressure 1 mmHg for 2 hr. According to the present invention, when the component (B) regulated to a weight loss of not more than 3% by weight is used, handling at the time of contact of the component (B) with the indispensable component (A) and the optional component (C) described below is preferably carried out in such a manner that the same weight loss occurs.

Component (C):

The organoaluminum compound optionally used as the component (C) of the catalyst in the present invention will be described. According to the present invention, organoaluminum compounds represented by formula [7] may be suitably used.

$$AlR_aP_{3-a} \qquad [7]$$

In formula [7], R represents a hydrocarbon group having 1 to 20 carbon atoms, p represents hydrogen, a halogen, alkoxy, or siloxy group, and a is a number of greater than 0 to 3. Specific examples of organoaluminum compounds represented by formula [7] include: trialkylaluminums, such as trimethylaluminum, triethylaluminum, tripropylaluminum, and triisobutylaluminum; halogen containing alkylaluminums such as diethylaluminum monochloride; and alkoxy-containing alkylaluminums such as diethylaluminum monomethoxide. Among them, trialkylaluminums are preferred. Aluminoxanes, such as methylaluminoxane, may also be used as the component (C). In this connection, it should be noted that, when the component (B) is an alumoxane, the alumoxane is excluded from the exemplification of the component (c).

Preparation of catalyst:

The catalyst for the polymerization of an olefin may be prepared by bringing the components (A) and (B) as the indispensable components and the component (C) as the optional component into contact with one another. In this case, the contact method is not particularly limited. For example, these components may be contacted in the following manner. Specifically, the contact may be carried out at the time of the preparation of the catalyst, as well as at the time of the prepolymerization of an olefin or the polymerization of an olefin.

(1) The component (A) is contacted with the component (B).

(2) The component (A) is contacted with the component (B), followed by addition of the component (C).

(3) The component (A) is contacted with the component (C), followed by addition of the component (B).

(4) The component (B) is contacted with the component (C), followed by addition of the component (A).

(5) The components (A), (B), and (C) are simultaneously contacted.

At the time of or after the contact of the catalyst components, a polymer, such as polyethylene or polypropylene, and a solid of an inorganic oxide, such as silica or alumina, may be allowed to coexist or may be contacted.

The contact of the components may be carried out in an inert gas, such as nitrogen, or an inert hydrocarbon solvent, such as pentane, hexane, heptane, toluene, or xylene. The contact temperature preferably ranges from −20° C. to the boiling point of the solvent, particularly preferably from room temperature to the boiling point of the solvent.

The amounts of the components (A) and (B) used may be suitable ones. For example, in the case of solvent polymerization, the amount of the component (A) used is generally $10^{-7}$ to $10^2$ mmol/L, preferably $10^{-4}$ to 1 mmol/L, in terms of the transition metal atom. In the case of the aluminumoxy compound, the aluminum to transition metal (aluminum/transition metal) molar ratio is generally 10 to $10^5$, preferably 100 to $2 \times 10^4$, more preferably 100 to $10^4$. When the ionic compound or the Lewis acid is used as the component (B), the molar ratio of the component (B) to the transition metal (component (B)/transition metal) is generally 0.1 to 1000, preferably 0.5 to 100, more preferably 1 to 50.

When the ion-exchangeable layered compound excluding silicates or the inorganic silicate is used as the component (B), the amount of the component (A) per g of the component (B) is generally $10^{-4}$ to 10 mmol, preferably $10^{-3}$ to 5 mmol, and the amount of the component (C) per g of the component (B) is generally 0.01 to $10^4$ mmol, preferably 0.1 to 100 mmol. The atomic ratio of aluminum contained in the component (C) to the transition metal contained in the component (A) is generally 1:0.01 to $10^6$, preferably 1:0.1 to $10^5$. The catalyst thus prepared may be used either as such without washing or after washing. If necessary, the component (C) may be additionally used in combination with the catalyst. Specifically, when the catalyst has been prepared using the component (A) and/or the component (B) and the component (C), the component (C) may be further added to the reaction system, separately from the preparation of the catalyst. In this case, the amount of the component (C) is determined so that the atomic ratio of aluminum contained in the component (C) to the transition metal contained in the component (A) is 1:0 to $10^4$.

Further, a particulate carrier may coexist as an optional component. The particulate carrier is composed of an inorganic or organic compound and generally has a particle diameter of 5 μm to 5 mm, preferably 10 μm to 2 mm.

Inorganic carriers usable herein include, for example, oxides, such as $SiO_2$, $Al_2O_3$, MgO, ZrO, $TiO_2$, $B_2O_3$, and ZnO, and composite oxides, such as $SiO_2$—MgO, $SiO_2$—$Al_2O_3$, $SiO_2$—$TiO_2$, $SiO_2$—$Cr_2O_3$, and $SiO_2$—$Al_2O_3$—MgO.

Organic carriers usable herein include, for example, particulate porous carriers of (co)polymers of α-olefins having 2 to 14 carbon atoms, such as ethylene, propylene, 1-butene, and 4-methyl-1-pentene, and (co)polymers of aromatic unsaturated hydrocarbons, such as styrene and divinylbenzene. The specific surface area is generally 20 to 1000 $m^2/g$, preferably 50 to 700 $m^2/g$, and the pore volume is generally not less than 0.1 $cm^2/g$, preferably not less than 0.3 $cm^2/g$, more preferably not less than 0.8 $cm^2/g$.

The catalyst for the polymerization of an olefin may contain, as an optional component other than the particulate carrier, for example, active hydrogen-containing compounds, such as $H_2O$, methanol, ethanol, and butanol; electron-donating compounds, such as ethers, esters, and amines; and alkoxy-containing compounds, such as phenyl borate, dimethylmethoxyaluminum, phenyl phosphite, tetraethoxysilane, and diphenyldimethoxysilane.

In the catalyst for the polymerization of an olefin, aluminumoxy compounds, ionic compounds, which, upon a reaction with the component (A), can convert the component (A) to a cation, Lewis acids, ion-exchangeable layered compounds excluding silicates, and inorganic silicates may be used alone as the component (B). Alternatively, they may be suitably used in combination of two or more. One or two or more of lower alkylaluminums, halogen-containing alkylaluminums, alkylaluminum hydrides, alkoxy-containing alkylaluminums, and aryloxy-containing alkylaluminums as the optional component (C) is preferably contained, in combination with the aluminumoxy compound, the ionic compound, or the Lewis acid, in the catalyst for the polymerization of an olefin.

When the components (A), (B), and (C) are previously contacted, the so-called "prepolymerization" may be carried out wherein a monomer to be polymerized may be allowed to exist to polymerize a part of the α-olefin. Specifically, a method may be used wherein, prior to the polymerization, an olefin, such as ethylene, propylene, 1-butene, 1-hexene, 1-octene, 4-methyl-1-pentene, 3-methyl-1-butene, a vinylcycloalkane, or styrene, is prepolymerized and, the prepolymerization product optionally after washing is used as a catalyst in the polymerization. Preferably, this prepolymerization is carried out in an inert solvent under mild conditions. Further, preferably, the prepolymerization is carried out so that a polymer generally in an amount of 0.01 to 1000 g, preferably 0.1 to 100 g, per g of the solid catalyst is produced.

[Production of Propylene Block Copolymer]

The propylene block copolymer is generally produced in two stage polymerization. Preferably, the block (a) is produced in the first stage polymerization, and the block (b) is then produced in the second stage polymerization. In the first stage polymerization, homopolymerization of propylene or copolymerization of propylene with a comonomer selected from the group consisting of ethylene and α-olefins having 4 to 20 carbon atoms is carried out in the presence of the components (A) and (B) or alternatively in the presence of the components (A), (B) and (C) to prepare a crystalline homopolymer of propylene or a propylene-α-olefin copolymer having a propylene content of not less than 90% by mole.

In the first stage polymerization, the polymerization temperature and the polymerization time are generally selected so that the amount of the polymer produced in the first stage polymerization is 50 to 95% by weight based on the total amount of the polymer produced. The polymerization temperature is generally −20 to 150° C., preferably 0 to 100° C. Hydrogen is preferably used as a molecular weight modifier.

Next, in the second stage polymerization, propylene is copolymerized with a comonomer selected from the group consisting of ethylene and α-olefins having 4 to 20 carbon atoms in the presence of the polymer produced in the first stage polymerization. Propylene and the comonomer are polymerized generally in a ratio (molar ratio) of 5/95 to 90/10. The polymerization temperature and the polymerization time are generally selected so that the amount of the polymer produced in the second stage polymerization is 5 to 50% by weight based on the total amount of the polymer produced. The polymerization temperature is generally 1 to 100° C., preferably 20 to 90° C. Hydrogen is preferably used as a molecular weight modifier.

These polymerization reactions are carried out in the presence or absence of a solvent, for example, an inert hydrocarbon, such as propane, butane, hexane, heptane or toluene, or a liquefied α-olefin. Preferably, the polymerization is carried out in the presence of a liquefied α-olefin or in the absence of a solvent.

After the first stage and second stage polymerization reactions, copolymerization of propylene with other α-olefin, homopolymerization of ethylene, or copolymerization of ethylene with other α-olefin may be carried out in the third stage and later stage polymerization reactions.

According to the present invention, as described above, the "block copolymer" does not always refer to only an ideal form such that the block produced in the first stage polymerization (block (a)) and the block produced in the second stage polymerization (block (b)) are present on one molecular chain, and, according to usage, embraces various forms of polymers, for example, a physical mixture of polymers produced in the individual stages and a chemical bonded product or physical mixture of this physical mixture with the ideal block copolymer.

(2) Composition I

The propylene polymer composition according to the present invention comprises: the propylene block copolymer; and, compounded with the propylene block copolymer, at least one metal salt selected from the group consisting of 1) metal salts of aromatic phosphoric acids and 2) metal salts of aromatic or alicyclic carboxylic acids, or at least one compound selected from the group consisting of 3) aromatic phosphoric ester compounds having a melting point of 50° C. or above and 4) hindered phenolic compounds, or at least one compound selected from the group consisting of 5) hindered amine compounds, 6) triazole compounds, 7) benzophenone compounds, and 8) benzoate compounds, or at least one compound selected from the group consisting of 9) fatty acid glycerol esters and 10) fatty acid diethanol amide compounds. Any one of these metal salts and compounds may be used alone, or alternatively two or more of these metal salts and compounds may be used in combination.

According to the present invention, examples of metal salts of aromatic phosphoric acids and metal salts of aromatic or alicyclic carboxylic acids are as follows.

1) Metal Salts of Aromatic Phosphoric Acids:

For example, sodium 2,2-methylene-bis(4,6-di-t-butylphenyl)phosphate and sodium bis(4-t-butylphenyl)phosphate.

2) Metal Salts of Aromatic or Alicyclic Carboxylic Acids:

For example, aluminum hydroxy-di(t-butylbenzoate), metal salts of rosin, sodium benzoate, and lithium benzoate.

The metal salt of rosin refers to a reaction mixture produced by reacting rosin with a metal compound.

Among them, the metal salt of rosin will be described. Rosins usable herein include: naturally occurring rosins, for example, gum rosin, which is the residue obtained upon steam distillation of oleoresin to remove turpentine oil, tall oil rosin, and wood rosin obtained by subjecting the stump of pine trees or pine to extraction with a solvent or occasionally with an alkaline solution and then acidifying the extract; various modified rosins obtained by modifying the above rosins, such as disproportionated rosin, hydrogenated rosin, dehydrogenated rosin, polymerized rosin, and α, β-ethylenically unsaturated carboxylic acid-modified rosin; and purified rosins obtained by purifying the above rosins.

The rosin contains a plurality of resin acids selected from pimaric acid, sandaracopimaric acid, palustric acid, isopimaric acid, abietic acid, dehydroabietic acid, neoabietic acid, dihydropimaric acid, dihydroabietic acid, tetrahydroabietic acid and the like.

Specifically, the rosin generally comprises: 80 to 97% by weight of a resin acid component comprising 30 to 40% by weight of abietic acid, 10 to 20% by weight of neoabietic acid, 14% by weight of dihydroabietic acid, 14% by weight of tetrahydroabietic acid, 8% by weight of d-pimaric acid, 8% by weight of iso-d-pimaric acid, 5% by weight of dehydroabietic acid, and 0.1% by weight of levopimaric acid; disproportionation products; and minor amounts of other types of rosins.

In the above rosin, heat stability is unsatisfactory due to the presence of unsaturated bonds. In order to solve this problem, the rosin may be reduced with hydrogen to form saturated rosin (hydrogenated rosin).

Metals usable for forming metal salts with the above rosins include mono- to tri-valent metal ions, and specific examples thereof include metals, such as alkali metals, alkaline earth metals, and aluminum. Among others, preferred metals are: monovalent metal ions, such as lithium, sodium, potassium, rubidium, and cesium ions; divalent metal ions, such as beryllium, magnesium, calcium, strontium, barium, and zinc ions; and trivalent metal ions, such as aluminum ions. Among them, lithium, sodium, potassium, magnesium, calcium, and aluminum are preferred.

Metal salts formed from the rosin and the metal include compounds that have a mono- to tri-valent metal element, such as sodium, potassium, or magnesium, and form a salt with the rosin, and specific examples thereof include chlorides, nitrates, acetates, sulfates, carbonates, and oxides of mono- to tri-valent metals.

Among these metal salts of rosins, at least one metal salt of the rosin selected from sodium, potassium, and magnesium salts of the rosins is preferred, and at least one metal salt of the rosin selected from metal salts of hydrogenated rosin, metal salts of disproportionated rosin, and metal salts of dehydrogenated rosin is more preferred.

Mixing the rosin with the mono- to tri-valent metal in a solvent generally at about 40 to 150° C., preferably 50 to 120° C. permits a reaction to proceed to give a reaction mixture containing a metal salt of the rosin. The degree of conversion in the reaction of the rosin with the mono- to tri-valent metal is preferably not more than 50% from the viewpoint of a good balance against the amount of the metal salt of the rosin incorporated.

Regarding the metal salt of the rosin, for example, a magnesium salt of rosin is commercially available from Arakawa Chemical Industries, Ltd. under the trade designation "PINECRYSTAL KM-1500."

According to the present invention, alternatively, at least one compound selected from the group consisting of aromatic phosphoric ester compounds having a melting point of 50° C. or above and hindered phenolic compounds may be compounded with the propylene block copolymer. That is, any one compound selected from the aromatic phosphoric ester compounds and the hindered phenolic compounds may be solely used, or alternatively, two or more compounds may be selected and used in combination.

3) Aromatic Phosphoric Ester Compounds

Specific examples of aromatic phosphoric ester compounds having a melting point of 50° C. or above usable in the present invention include tris(2,4-di-t-butylphenyl)phosphite, bis(2,4-di-t-butylphenyl)pentaerythritol-di-phosphite, tetrakis(2,4-di-t-butylphenyl)-4,4'-biphenylenediphosphonite, tetrakis(2,4-di-t-butyl-5-methylphenyl)-4,4'-biphenylenediphosphonite, and bis(2,6-di-t-butyl-4-methylphenyl)pentaerythritol-di-phosphite.

Among them, tris(2,4-di-t-butylphenyl) phosphite, bis(2,4-di-t-butylphenyl)pentaerythritol-di-phosphite, and tetrakis(2,4-di-t-butylphenyl)-4,4-biphenylenediphosphonite are particularly preferred. Aromatic phosphoric ester compounds having a melting point below 50° C. are likely to retain water therein, leading to unfavorable phenomena, such as hydrolysis.

4) Hindered Phenolic Compounds

Specific examples of hindered phenolic compounds include: tris(3,5-di-t-butyl-4-hydroxybenzyl)-isocyanurate; 1,1,3-tris(2-methyl-4-hydroxy-5-t-butylphenyl)butane; pentaerythrityl-tetrakis[3-(3,5-di-t-butyl-4-hydroxyphenyl)propionate]; 1,3,5-trimethyl-2,4,6-tris(3,5-di-t-butyl-4-hydroxybenzyl)benzene; 3,9-bis{2-[3-(3-t-butyl-4-hydroxy-5-methylphenyl)propionyloxy]-1,1-dimethylethyl}-2,4,8,10-tetraoxaspiro[5,5]undecane; and 1,3,5-tris(4-t-butyl-3-hydroxy-2,6-dimethylbenzyl)isocyanuric acid.

Among them, pentaerythrityl-tetrakis[3-(3,5-di-t-butyl-4-hydroxyphenyl)propionate] and 3,9-bis{2-[3-(3-t-butyl-4-hydroxy-5-methylphenyl)propionyloxy]-1,1-dimethylethyl}-2,4,8,10-tetraoxaspiro[5,5]undecane are particularly preferred.

According to the present invention, alternatively, at least one compound selected from the group consisting of 5) hindered amine compounds, 6) triazole compounds, 7) benzophenone compounds, and 8) benzoate compounds may be compounded with the propylene block copolymer. That is, any one compound selected from the compounds 5) to 8) may be solely used, or alternatively, two or more compounds may be selected and used in combination.

5) Hindered Amine Compounds

Specific examples of hindered amine compounds usable in the present invention include: bis(2,2,6,6-tetramethyl-4-piperidyl)sebacate; a polycondensate of dimethyl succinates with 1-(2-hydroxyethyl)-4-hydroxy-2,2,6,6-tetramethylpiperidine; tetrakis(1,2,2,6,6-pentamethyl-4-piperidyl)-1,2,3,4-butane tetracarboxylate; a condensate of N,N-bis(3-aminopropyl)ethylenediamine with 2,4-bis[N-butyl-N-(1,2,2,6,6-pentamethyl-4-piperidyl)amino]-6-chloro-1,3,5-triazine; poly[{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino})]; poly{(6-morpholino-s-triazine-2,4-diyl)[(2,2,6,6-tetramethyl-4-piperidyl)imino]hexamethylene[(2,2,6,6-tetramethyl-4-piperidyl)imino]}; and bis(1,2,2,6,6-pentamethyl-4-piperidyl)sebacate.

Among them, bis(2,2,6,6-tetramethyl-4-piperidyl) sebacate, tetrakis(1,2,2,6,6-pentamethyl-4-piperidyl)-1,2,3,4-butane tetracarboxylate, a condensate of N,N-bis(3-aminopropyl)ethylenediamine with 2,4-bis[N-butyl-N-(1,2,2,6,6-pentamethyl-4-piperidyl)amino]-6-chloro-1,3,5-triazine, and poly[{6-(1,1,3,3-tetramethylbutyl)imino-1,3,5-triazine-2,4-diyl}{(2,2,6,6-tetramethyl-4-piperidyl)imino}hexamethylene{(2,2,6,6-tetramethyl-4-piperidyl)imino}] are particularly preferred.

6) Triazole Compounds

Specific examples of triazole compounds usable in the present invention include 2-(2-hydroxy-3-t-butyl-5-methylphenyl)-5-chlorobenzotriazole, 2,2'-methylene-bis[4-(1,1,3,3-tetramethylbutyl)-6-(2H-benzotriazole-2-yl)phenol], and 2-(2'-hydroxy-3',5'-di-t-butylphenyl)-5-chlorobenzotriazole.

7) Benzophenone Compounds

Specific examples of benzophenone compounds usable in the present invention include 2-hydroxy-4-n-octoxybenzophenone.

8) Benzoate Compounds

Specific examples of benzoate compounds usable in the present invention include 2,4-di-t-butyl-phenyl-3,5-di-t-butyl-4-hydroxybenzoate.

According to the present invention, alternatively, at least one compound selected from the group consisting of 9) fatty acid glycerol esters and 10) fatty acid diethanol amide compounds may be compounded with the propylene block copolymer. That is, any one compound selected from the compounds 9) and 10) may be solely used, or alternatively, two or more compounds may be selected and used in combination.

9) Fatty Acid Glycerol Esters

Specific examples of fatty acid glycerol esters usable in the present invention include esters of glycerol with higher fatty acids having 12 to 18 carbon atoms, such as glyceryl monostearate and glyceryl monolaurate.

10) Fatty Acid Diethanol Amide Compounds

Specific examples of fatty acid diethanol amide compounds usable in the present invention include diethanolamide laurate.

The propylene polymer composition according to the present invention comprises: 100 parts by weight of the above propylene block copolymer; and 0.001 to 1 part by weight, preferably 0.01 to 0.8 part by weight, of at least one compound selected from the group consisting of 1) metal salts of aromatic phosphoric acids and 2) metal salts of aromatic or alicyclic carboxylic acids, or 0.001 to 1 part by weight, preferably 0.01 to 0.8 part by weight, of at least one compound selected from the group consisting of 3) aromatic phosphoric ester compounds having a melting point of 50° C. or above and 4) hindered phenolic compounds, or 0.001 to 1 part by weight, preferably 0.01 to 0.8 part by weight, of at least one compound selected from the group consisting of 5) hindered amine compounds, 6) triazole compounds, 7) benzophenone compounds, and 8) benzoate compounds, or 0.001 to 1 part by weight, preferably 0.01 to 0.8 part by weight, of at least one compound selected from the group consisting of 9) fatty acid glycerol esters and 10) fatty acid diethanol amide compounds.

(3) Other Additional Components (Optional Components)

The propylene polymer composition according to the present invention may contain, in addition to the above indispensable components, other additional components so far as they are not detrimental to the effect of the present invention. In the case of the composition according to claim 5, examples of the optional component include compounds according to claims 6 to 8 and other additives and assistants described below.

In the case of the composition according to claim 6, examples of the optional component include metal salts and compounds according to claims 5, 7 and 8 and other additives and assistants described below.

In the case of the composition according to claim 7, examples of the optional component include metal salts and compounds according to claims 5, 6 and 8 and other additives and assistants described below.

In the case of the composition according to claim 8, examples of the optional component include metal salts and compounds according to claims 5 to 7 and other additives and assistants described below.

(Other Additives and Assistants)

Additives and assistants other than described above include those used for polyolefins, such as sulfur antioxidants, neutralizers, lubricants, metal inactivators, colorants, dispersants, peroxides, fillers, fluorescent brighteners, organic or inorganic antimicrobial agents, and resins other than used in the present invention, for example, ethylene-propylene rubbers, ethylene-butene rubbers, ethylene-hexene rubbers, and ethylene-octene rubbers.

Examples of sulfur antioxidants include di-stearyl-thio-di-propionate, di-myristyl-thio-di-propionate, and pentaerythritol-tetrakis(3-lauryl-thio-propionate).

Neutralizers usable herein include calcium stearate, zinc stearate, calcium behenate, zinc behenate, calcium 12-hydroxystearate, zinc 12-hydroxystearate, calcium lactate, hydrotalcite, and lithium aluminum composite oxide chloride (tradename: MIZUKALAC, manufactured by Mizusawa Industrial Chemicals Ltd.).

Lubricants usable herein include higher fatty acid amides, such as oleic acid amide, stearic acid amide, behenic acid amide, ethylenebisstearoid, silicone oil, and higher fatty esters.

(4) Composition II

Among the propylene resin compositions according to the present invention, the composition II comprises the propylene block copolymer and, compounded therewith, an inorganic filler.

Specific examples of inorganic fillers usable herein include: naturally occurring silicic acid and silicates, such as finely divided talc, kaolinite, calcined clay, pyrophyllite, sericite, and wollastonite; carbonates, such as precipitated calcium carbonate, heavy calcium carbonate, and magnesium carbonate; hydroxides, such as aluminum hydroxide and magnesium hydroxide; oxides, such as zinc oxide, zinc flower, and magnesium oxide; powdery fillers of synthetic silicic acid or silicates, such as hydrous calcium silicate, hydrous aluminum silicate, hydrous silicic acid, and silicic acid anhydride; flake fillers, such as mica; fibrous fillers, such as basic magnesium sulfate whiskers, calcium titanate whiskers, aluminum borate whiskers, sepiolite, glass fibers, PMF (processed mineral fibers), xonotlite, potassium titanate, ellestadite; and balloon fillers, such as glass balloon and fly ash balloon.

According to the present invention, among them, talc is preferred. Particularly preferred is a finely divided talc having an average particle diameter of 0.1 to 40 μm.

The average particle diameter of talc may be measured by the liquid phase precipitation method. The inorganic filler used in the present invention, particularly talc, may be used either as such without any treatment or after surface treatment. Specific examples of surface treatment methods include chemical or physical treatment methods using treatment agents, such as silane coupling agents, higher fatty acids, metal salts of fatty acids, unsaturated organic acids, organotitanates, resin acids, and polyethylene glycol. The use of the surface treated talc can provide resin compositions which are excellent also in weld strength, coating properties, and moldability.

Any one of the above inorganic fillers may be used alone, or alternatively two or more of them may be used in combination. Further, according to the present invention, the inorganic filler may be used in combination with organic fillers, such as high styrenes and lignins.

The composition II according to the present invention comprises 20 to 99% by weight, preferably 50 to 90% by weight, of the propylene block copolymer and 1 to 80% by weight, preferably 5 to 50% by weight, of an inorganic filler. This composition II according to the present invention possesses excellent rigidity, impact strength, and heat resistance.

(5) Composition III

Among the propylene resin compositions according to the present invention, the composition III comprises: the propylene block copolymer; and, compounded with the propylene block copolymer, an inorganic filler and an elastomer. Specific examples of inorganic fillers usable herein include those described above in connection with the composition II.

Elastomers usable herein include ethylene-α-olefin random copolymer rubbers and styrene-containing thermoplastic elastomers.

[Ethylene-α-olefin Random Copolymer Rubber]

The content of α-olefin units in the ethylene-α-olefin random copolymer rubber is 15 to 70% by weight, preferably 20 to 55% by weight. When the α-olefin unit content is below the lower limit of the above content range, the impact strength is poor. On the other hand, when the α-olefin unit content exceeds the upper limit of the above content range, the rigidity is disadvantageously lowered. Further, in this case, it is difficult to maintain the elastomer in the pellet form, disadvantageously resulting in significantly deteriorated handleability in the production of the resin composition.

Preferred α-olefins include those having 3 to 20 carbon atoms. Specific examples thereof include propylene, 1-butene, 1-pentene, 1-hexene, 1-heptene, 1-octene, 1-nonene, 1-decene, 1-undecene, and 1-dodecene. Among them, propylene, 1-butene, 1-pentene, 1-hexene, 1-heptene, and 1-octene are preferred.

The MFR (230° C., load 2.16 kg) of the ethylene-α-olefin random copolymer rubber is preferably 0.01 to 100 g/10 min, particularly preferably 0.1 to 100 g/10 min. The density of the ethylene-α-olefin random copolymer rubber is preferably 0.85 to 0.90 g/cm$^3$, particularly preferably 0.86 to 0.89 g/cm$^3$.

When the MFR is less than 0.01 g/10 min, satisfactory dispersion cannot be achieved at the time of kneading in the production of the resin composition. This leads to lowered impact strength. On the other hand, when the MFR exceeds 100 g/10 min, the toughness of the copolymer rubber per se is unsatisfactory. Here again, this leads to lowered impact strength. When the density exceeds 0.90 g/cm$^3$, the impact strength is poor, while when the density is less than 0.85 g/cm$^3$, it is difficult to pelletize the composition per se.

The ethylene-α-olefin random copolymer rubber is preferably produced in the presence of a vanadium compound catalyst described below or a metallocene catalyst as described in WO-91/04257 and the like.

The α-olefin content is measured by a conventional method, such as infrared spectrum analysis or $^{13}$C-NMR.

The MFR is measured according to JIS K 7210, and the density is measured according to JIS K 7112.

The ethylene-α-olefin random copolymer rubber may be produced by polymerization, and examples of polymerization methods usable herein include gas phase fluidized bed polymerization, solution polymerization, slurry polymerization, and high pressure polymerization. Further, a minor amount of a diene component, for example, dicyclopentadiene or ethylidenenorbornene, may be copolymerized.

Polymerization catalysts include titanium compounds, such as titanium halides, vanadium compounds, organoaluminum-magnesium complexes, such as alkylaluminum-magnesium complexes and alkylalkoxyaluminum-magnesium complexes, the so-called Ziegler catalysts comprising a combination with organometallic compounds, such as alkylaluminums or alkylaluminum chlorides, or metallocene catalysts as described in WO-91/04257 and the like. A catalyst called "metallocene catalyst" is a catalyst preferably comprising a combination of a metallocene compound with an alumoxane although the alumoxane may not be contained, that is, the so-called "Kaminsky catalyst."

[Styrene-Containing Thermoplastic Elastomer]

In the styrene-containing thermoplastic elastomer used in the present invention, the content of a polystyrene portion is 5 to 60% by weight, preferably 10 to 30% by weight. When the polystyrene content is outside the above content range, the impact resistance is unsatisfactory.

The MFR (230° C., load 2.16 kg) of the styrene-containing thermoplastic elastomer is 0.01 to 100 g/10 min, preferably 0.1 to 50 g/10 min. When the MFR is outside the above range, here again, the impact resistance is unsatisfactory.

Specific examples of the styrene-containing thermoplastic elastomer include a styrene-ethylene/butylene-styrene block copolymer (SEBS).

The styrene-ethylene/butylene-styrene block copolymer is a thermoplastic elastomer comprising polystyrene block units and polyethylene/butylene rubber block units. In this SEBS, polystyrene block units as a hard segment form physical bridges (domains) and are present as crosslinking sites of rubber block units, and rubber block units present between polystyrene block units are a soft segment and have rubber elasticity.

The SEBS used in the present invention preferably contains 10 to 40% by mole of polystyrene units. The content of units derived from styrene is measured by a conventional method such as infrared spectrum analysis or $^{13}$C-NMR.

This SEBS may be produced by a conventional production process described, for example, in Japanese Patent Publication No. 57463/1985. More specific examples of SEBS include Kraton G1650, Kraton G1652, and Kraton G1657 (each tradename, manufactured by Shell Kagaku K. K.) and Tuftec (tradename, manufactured by Asahi Chemical Industry Co, Ltd.).

The SEBS used in the present invention is generally known as a hydrogenation product of SBS (styrene-butadiene-styrene block copolymer), a styrene-butadiene block copolymer. According to the present invention, SEBS may be used in combination with SBS and other styrene-conjugated diene copolymers or complete or incomplete hydrogenation products thereof.

Specific examples of styrene-conjugated diene copolymers include SBR (styrene-butadiene random copolymer, SBS, PS-polyisobutylene block copolymer, SIS (styrene-isobutylene-styrene block copolymer), and a hydrogenation product of SIS (SEPS).

More specific examples of styrene-conjugated diene copolymers include Kraton (manufactured by Shell Kagaku K. K.), Cariflex TR (manufactured by Shell Chemical), Solprene (manufactured by Philips Petroleum International GmbH), Europrene SOLT (manufactured by Enichem), Tufprene (manufactured by Asahi Chemical Industry Co, Ltd.), Solprene-T (manufactured by Japan Elastomer Co., Ltd.), JSRTR (manufactured by Japan Synthetic Rubber Co., Ltd.), Denka STR (manufactured by Denki Kagaku Kogyo K. K.), QUINTAC (manufactured by Nippon Zeon Co., Ltd.), Kraton G (manufactured by Shell Kagaku K. K.), and Tuftec (manufactured by Asahi Chemical Industry Co, Ltd.) (all the above products being tradenames).

According to the present invention, any one of the above ethylene-α-olefin random copolymer rubbers and styrene-containing thermoplastic elastomers may be used alone as the elastomer component, or alternatively, any two or more of them may be used in combination as the elastomer component.

The composition III according to the present invention comprises 10 to 98% by weight, preferably 49 to 94% by weight, of the propylene block copolymer, 1 to 80% by weight, preferably 5 to 50% by weight, of the inorganic filler, and 1 to 89% by weight, preferably 1 to 40% by weight, of the elastomer. This composition III according to the present invention possesses excellent rigidity, low-temperature impact resistance, and heat resistance.

If necessary, in addition to the above indispensable components, a polyethylene resin may be compounded as an optional component with the composition III according to the present invention. Polyethylene resins usable herein include those produced by slurry, gas phase, solution, high pressure ion, high pressure radical or other polymerization method in the presence of a Ziegler, chromium, metallocene or other catalyst.

This polyethylene resin may be either a homopolymer of ethylene or an ethylene-α-olefin copolymer. Preferably, the polyethylene resin has an MFR (190° C. load 2.16 kg) of 0.1 to 200 g/10 min and a density of 0.90 to 0.97 g/cm$^3$. In the case of the ethylene-α-olefin copolymer, specific examples of α-olefins contained therein include propylene, 1-butene, 1-pentene, 1-hexene, 1-heptene, 1-octene, 1-nonene, 1-decene, 1-undecene, and 1-dodecene. The content of α-olefin units in the ethylene-α-olefin copolymer is 0 to 15% by mole.

Specific examples of polyethylenes include high density polyethylene, linear low density polyethylene, and low density polyethylene.

The content of the polyethylene resin in the composition III according to the present invention is preferably 1 to 88% by weight, particularly preferably 1 to 40% by weight. According to the present invention, the incorporation of the polyethylene resin can advantageously improve the rigidity, impact resistance, and heat resistance and, in addition, can improve the bonding strength between the composition and a coating provided thereon.

(6) Composition IV

Among the propylene resin compositions according to the present invention, the composition IV comprises: the propylene block copolymer; and, compounded with the propylene block copolymer, an inorganic filler and a polypropylene resin produced in the presence of a Ziegler catalyst (hereinafter referred to as a "Ziegler polypropylene). Specific examples of inorganic fillers usable herein are the same as those described above in connection with the composition II.

The Ziegler polypropylene will be described. Specific examples of production methods of the Ziegler catalyst include a method wherein titanium tetrachloride is reduced with an organoaluminum compound and is further treated with various electron donors and electron acceptors to prepare a titanium trichloride composition which is used in combination with an organoaluminum compound, and a method for producing a supported catalyst wherein titanium tetrachloride and various electron donors are brought into contact with a magnesium halide.

Homopolymerization of propylene, block copolymerization of propylene with ethylene, or random copolymerization of propylene with ethylene by a production process, such as slurry polymerization, gas phase polymerization, or liquid phase bulk polymerization in the presence of the Ziegler catalyst thus obtained can provide the Ziegler polypropylene according to the present invention.

In the production of the propylene-ethylene block copolymer, homopolymerization of propylene followed by random copolymerization of propylene with ethylene to prepare a block copolymer is preferred from the viewpoint of quality.

The propylene-ethylene block copolymer may be a ter- or higher co-polymer containing, in addition to propylene and ethylene, other unsaturated compound(s), for example, an α-olefin, such as 1-butene, or a vinyl ester, such as vinyl acetate, in such an amount as will not be detrimental to the effect of the present invention, or a mixture of the propylene-ethylene block copolymer with the above ter- or higher co-polymer.

The MFR (230° C., load 2.16 kg) of the Ziegler polypropylene is preferably 0.01 to 200 g/10 min, particularly preferably 0.1 to 200 g/10 min.

The composition IV according to the present invention comprises 10 to 94% by weight, preferably 40 to 85% by weight, of the propylene block copolymer, 1 to 80% by weight, preferably 5 to 50% by weight, of the inorganic filler, and 5 to 89% by weight, preferably 10 to 50% by weight, of the Ziegler polypropylene. This composition IV according to the present invention possesses excellent rigidity, low-temperature impact resistance, and heat resistance and, at the same time, possesses good fluidity and improved moldability.

(7) Composition V

Among the propylene resin compositions according to the present invention, the composition V comprises: the propylene block copolymer; and, compounded with the propylene block copolymer, an inorganic filler, an elastomer, and a polypropylene resin produced in the presence of a Ziegler catalyst. Specific examples of inorganic fillers usable herein are the same as those described above in connection with the composition II. Specific examples of elastomers usable herein are the same as those described above in connection with the composition III. Specific examples of polypropylene resins produced in the presence of a Ziegler catalyst are the same as the Ziegler polypropylenes used in the composition IV.

The composition V according to the present invention comprises 10 to 93% by weight, preferably 39 to 84% by weight, of the propylene block copolymer, 1 to 80% by weight, preferably 5 to 50% by weight, of the inorganic filler, 1 to 84% by weight, preferably 1 to 40% by weight, of the elastomer, and 5 to 88% by weight, preferably 10 to 50% by weight, of the Ziegler polypropylene. This composition V according to the present invention possesses excellent rigidity, low-temperature impact resistance, and heat resistance and, at the same time, possesses good fluidity and improved moldability.

If necessary, in addition to the above indispensable components, a polyethylene resin may be compounded as an optional component with the composition V according to the present invention. Specific examples of polyethylene resins usable herein are the same as those used as the optional component in the composition III.

The content of the polyethylene resin in the composition V according to the present invention is preferably 1 to 83% by weight, particularly preferably 1 to 40% by weight. According to the present invention, the incorporation of the polyethylene resin can advantageously improve the rigidity, impact resistance, and heat resistance and, in addition, can improve the bonding strength between the composition and a coating provided thereon.

(8) Composition VI

Among the propylene resin compositions according to the present invention, the composition VI comprises: the propylene block copolymer; and, compounded with the propylene block copolymer, an elastomer. Specific examples of elastomers usable herein are the same as those used in the composition III.

The composition VI according to the present invention comprises 10 to 99% by weight, preferably 60 to 99% by weight, of the propylene block copolymer and 1 to 90% by weight, preferably 1 to 40% by weight, of the elastomer. This composition VI according to the present invention possesses excellent rigidity, low-temperature impact resistance, and heat resistance.

If necessary, in addition to the above indispensable components, a polyethylene resin may be compounded as an optional component with the composition VI according to the present invention. Specific examples of polyethylene resins usable herein are the same as those used as the optional component in the composition III.

The content of the polyethylene resin in the composition VI according to the present invention is preferably 1 to 89% by weight, particularly preferably 1 to 40% by weight. According to the present invention, the incorporation of the polyethylene resin can advantageously improve the rigidity, impact resistance, and heat resistance and, in addition, can improve the bonding strength between the composition and a coating provided thereon.

(9) Composition VII

Among the propylene resin compositions according to the present invention, the composition VII comprises: the propylene block copolymer; and, compounded with the propylene block copolymer, an elastomer and a polypropylene resin produced in the presence of a Ziegler catalyst. Specific examples of elastomers usable herein are the same as those used in the composition III. Specific examples of polypropylene resins produced in the presence of a Ziegler catalyst are the same as the Ziegler polypropylenes used in the composition IV.

The composition VII according to the present invention comprises 10 to 94% by weight, preferably 49 to 89% by weight, of the propylene block copolymer, 1 to 85% by weight, preferably 1 to 40% by weight, of the elastomer, and 5 to 89% by weight, preferably 10 to 50% by weight, of the Ziegler polypropylene. This composition VII according to the present invention possesses excellent rigidity, low-temperature impact resistance, and heat resistance and, at the same time, possesses good fluidity and improved moldability.

If necessary, in addition to the above indispensable components, a polyethylene resin may be compounded as an optional component with the composition VII according to the present invention. Specific examples of polyethylene resins usable herein are the same as those used as the optional component in the composition III.

The content of the polyethylene resin in the composition VII according to the present invention is preferably 1 to 84% by weight, particularly preferably 1 to 40% by weight. According to the present invention, the incorporation of the polyethylene resin can advantageously improve the rigidity, impact resistance, and heat resistance and, in addition, can improve the bonding strength between the composition and a coating provided thereon.

(10) Composition VIII

Among the propylene resin compositions according to the present invention, the composition VIII comprises: the propylene block copolymer; and, compounded with the propylene block copolymer, a glass fiber and an unsaturated carboxylic acid-modified polypropylene.

Glass fibers usable herein have an average fiber diameter of 2 to 30 $\mu$m, preferably 6 to 20 $\mu$m. The presence of a silane compound and an olefin component as a binder can advantageously enhance the adhesion to the propylene block copolymer as the matrix, leading to improved mechanical strength, heat resistance, and impact properties.

Silane compounds include vinyltriethoxysilane, vinyl-tris($\beta$-methoxyethoxy)silane, $\gamma$-methacryloxypropyltrimethoxysilane, $\beta$-(3,4-epoxycyclohexyl)ethyltrimethoxysilane, $\gamma$-glycidoxypropyltrimethoxysilane, $\gamma$-aminopropyltriethoxysilane, $\gamma$-(2-aminoethyl)aminopropyl-trimethoxysilane, and N-$\beta$-(aminoethyl)-$\gamma$-aminopropyltrimethoxysilane.

Olefin components usable herein include unsaturated carboxylic acid-modified polyolefins and low-molecular polyolefins. Unsaturated carboxylic acids usable in the unsaturated carboxylic acid-modified polyolefin include, for example, acrylic acid, methacrylic acid, maleic acid, fumaric acid, itaconic acid, citraconic acid, and acid anhydrides thereof. Among them, maleic anhydride is most preferred. Polyolefins include polyethylene, polypropylene, propylene block copolymer, ethylene-butylene copolymer, and ethylene-pentene copolymer.

The unsaturated carboxylic acid-modified polypropylene used in the present invention refers to a polypropylene which has been modified by grafting an unsaturated carboxylic acid on polypropylene.

Unsaturated carboxylic acids usable herein include, for example, acrylic acid, methacrylic acid, maleic acid, fumaric acid, itaconic acid, and citraconic acid. Further, acid anhydrides of these unsaturated carboxylic acids are also suitable. Among them, maleic anhydride is most preferred. The degree of modification with the unsaturated carboxylic acid is preferably 0.1 to 10% by weight, particularly preferably 0.2 to 5% by weight.

Besides a homopolymer of propylene, a copolymer of propylene with other $\alpha$-olefin may be mentioned as polypropylene used in the preparation of the unsaturated carboxylic acid-modified polypropylene. Specific examples thereof include a homopolymer, random copolymer or block copolymer of propylene. The molecular weight of the polypropylene is preferably 3,000 to 1,000,000.

In general, an organic peroxide is used to induce a graft reaction of the polypropylene with the unsaturated carboxylic acid. Organic peroxides usable herein include, for example, benzoyl peroxide, lauroyl peroxide, azobisisobutyronitrile, dicumyl peroxide, t-butyl hydroperoxide, β,β'-bis(t-butylperoxydiisopropyl)benzene, 2,5-dimethyl-2,5-di(t-butylperoxy)hexane, 2,5-dimethyl-2,5-di(t-butylperoxy)hexyne-3, di-t-butyl peroxide, cumen hydroperoxide, and t-butyl hydroperoxide.

The unsaturated carboxylic acid-modified polypropylene used in the present invention is particularly preferably a modification product obtained by grafting maleic anhydride on a homopolymer of propylene.

The composition VIII according to the present invention comprises 40 to 98% by weight, preferably 59 to 98% by weight, of the propylene block copolymer, 1 to 50% by weight, preferably 1 to 40% by weight, of the glass fiber, and 0.1 to 10% by weight, preferably 0.3 to 5% by weight, of the unsaturated carboxylic acid-modified polypropylene. This composition VIII according to the present invention possesses excellent rigidity, heat resistance, and impact resistance.

According to the composition VIII, inorganic fillers other than the glass fiber described above may be properly compounded as an optional component in an amount such that the effect of the present invention is not sacrificed.

Specific examples of inorganic fillers usable herein are the same as those used in the composition II except for the glass fiber.

According to the present invention, among them, talc is preferred. Specific examples of talc usable herein are the same as those used in the composition II.

Any one of these inorganic fillers may be used alone, or alternatively two or more of them may be used in combination. Further, according to the present invention, the inorganic filler may be used in combination with organic fillers, such as high styrenes and lignins.

(11) Composition IX

Among the propylene resin compositions according to the present invention, the composition IX comprises: the propylene block copolymer; and, compounded with the propylene block copolymer, a glass fiber and an unsaturated carboxylic acid-modified polypropylene and, in addition, an elastomer. Specific examples of the glass fiber and the unsaturated carboxylic acid-modified polypropylene usable herein are the same as those used in the composition VIII. Specific examples of the elastomer usable herein are the same as those used in the composition III.

The composition IX according to the present invention comprises 10 to 97% by weight, preferably 58 to 97% by weight, of the propylene block copolymer, 1 to 50% by weight, preferably 1 to 40% by weight, of the glass fiber, 0.1 to 10% by weight, preferably 0.3 to 5% by weight, of the unsaturated carboxylic acid-modified polypropylene, and 1 to 88% by weight, preferably 1 to 40% by weight, of the elastomer. This composition IX according to the present invention possesses excellent rigidity, heat resistance, and impact resistance.

If necessary, in addition to the above indispensable components, a polyethylene resin may be compounded as an optional component with the composition IX according to the present invention. Specific examples of polyethylene resins usable herein are the same as those used as the optional component in the composition III.

The content of the polyethylene resin in the composition IX according to the present invention is preferably 1 to 84% by weight, particularly preferably 1 to 40% by weight. According to the present invention, the incorporation of the polyethylene resin can advantageously improve the rigidity, impact resistance, and heat resistance and, in addition, can improve the bonding strength between the composition and a coating provided thereon.

(12) Composition X

Among the propylene resin compositions according to the present invention, the composition X comprises: the propylene block copolymer; and, compounded with the propylene block copolymer, a glass fiber, an unsaturated carboxylic acid-modified polypropylene, and a polypropylene resin produced in the presence of a Ziegler catalyst. Specific examples of the glass fiber and the unsaturated carboxylic acid-modified polypropylene usable herein are the same as those used in the composition VIII. Specific examples of polypropylene resins produced in the presence of a Ziegler catalyst usable herein are the same as the Ziegler polypropylens used in the composition IV.

The composition X according to the present invention comprises 10 to 93% by weight, preferably 48 to 88% by weight, of the propylene block copolymer, 1 to 50% by weight, preferably 1 to 40% by weight, of the glass fiber, 0.1 to 10% by weight, preferably 0.3 to 5% by weight, of the unsaturated carboxylic acid-modified polypropylene, and 5 to 88% by weight, preferably 10 to 50% by weight, of the Ziegler polypropylene. This composition X according to the present invention possesses excellent rigidity, heat resistance, and impact resistance and, at the same time, possesses good fluidity and improved moldability.

(13) Composition XI

Among the propylene resin compositions according to the present invention, the composition XI comprises: the propylene block copolymer; and, compounded with the propylene block copolymer, a glass fiber, an unsaturated carboxylic acid-modified polypropylene, an elastomer, and a polypropylene resin produced in the presence of a Ziegler catalyst. Specific examples of the glass fiber and the unsaturated carboxylic acid-modified polypropylene usable herein are the same as those used in the composition VIII. Specific examples of elastomers usable herein are the same as those used in the composition III. Specific examples of polypropylene resins produced in the presence of a Ziegler catalyst usable herein are the same as the Ziegler polypropylens used in the composition IV.

The composition XI according to the present invention comprises 10 to 92% by weight, preferably 47 to 87% by weight, of the propylene block copolymer, 1 to 50% by weight, preferably 1 to 40% by weight, of the glass fiber, 0.1 to 10% by weight, preferably 0.3 to 5% by weight, of the unsaturated carboxylic acid-modified polypropylene, 1 to 83% by weight, preferably 1 to 40% by weight of the elastomer, and 5 to 87% by weight, preferably 10 to 50% by weight, of the Ziegler polypropylene. This composition XI according to the present invention possesses excellent rigidity, heat resistance, and impact resistance and, at the same time, possesses good fluidity and improved moldability.

If necessary, in addition to the above indispensable components, a polyethylene resin may be compounded as an optional component with the composition XI according to the present invention. Specific examples of polyethylene resins usable herein are the same as those used as the optional component in the composition III.

The content of the polyethylene resin in the composition XI according to the present invention is preferably 1 to 82% by weight, particularly preferably 1 to 40% by weight. According to the present invention, the incorporation of the polyethylene resin can advantageously improve the impact resistance while suppressing the deterioration in rigidity.

(14) Other Components

In the propylene resin compositions (the compositions II to XI) according to the present invention, besides the above essential components, the following optional additives or compounding components may be incorporated in such an amount as will not be significantly detrimental to the effect of the present invention, or in order to improve the properties.

Specific examples of additives or compounding components usable herein include pigments for coloration, antioxidants, such as phenolic, sulfur, and phosphorus antioxidants, antistatic agents, photostabilizers, such as hindered amines, ultraviolet absorbers, various nucleating agents, such as organoaluminum talc, dispersants, neutralizers, foaming agents, metal deactivators, lubricants, flame retardants, various resins other than the block copolymers, and various rubber components, such as polybutadiene and polyisoprene.

Among them, for example, compounding of various nucleating agents and various rubbers is effective in improving the balance between properties, such as rigidity, impact strength and the like, and improving the dimensional stability. Further, compounding of the hindered amine stabilizer is effective in improving the weathering resistance and durability.

(15) Propylene Polymer

The propylene polymer according to the present invention satisfies requirement (a) for constituent units, requirement (b) for the melt flow rate, and requirement (c) for the average elution temperature and elution dispersion. Preferably, the propylene polymer satisfies, in addition to the requirements (a) to (c), requirement (d) for the fraction of isotactic pentad chain and requirement (e) for the content of a 1,3-regioirregular bond.

(a) Constituent Units

The propylene polymer used in the present invention comprises 100 to 80% by mole, based on the whole constituent unit, of constituent units derived from propylene (hereinafter referred to as "propylene units") and 0 to 20% by mole, based on the whole constituent unit, of constituent units derived from a comonomer selected from the group consisting of ethylene and α-olefins having 4 to 20 carbon atoms (hereinafter referred to as "comonomer units"). Preferably, the propylene unit content is 100 to 94% by mole, and the comonomer unit content is 0 to 6% by mole. When the comonomer unit content exceeds the upper limit of the above content range, the rigidity is significantly lowered. As a result, the practical properties are deteriorated.

Propylene polymers usable herein include homo- and co-polymers of propylene. Propylene copolymers may be random or block copolymers of propylene.

The comonomer used herein is preferably selected from the group consisting of ethylene and α-olefins having 4 to 20 carbon atoms. Specific examples of α-olefins having 4 to 20 carbon atoms include ethylene, butene-1, pentene-1, hexane-1, octane-1, and 4-methylpentene-1.

The content of propylene units and the content of comonomer units in the propylene polymer are measured by $^{13}$C-NMR (nuclear magnetic resonance), more specifically by FT-NMR (270 MHz) manufactured by JEOL (Japan Electric Optical Laboratory).

(b) Melt Flow Rate (MFR)

The propylene polymer according to the present invention has a melt flow rate (hereinafter abbreviated to "MFR," as measured according to JIS K 7210 (230° C., load 2.16 kg) of 0.1 to 200 g/10 min, preferably 1 to 200 g/10 min, particularly preferably 4 to 200 g/10 min. When the MFR exceeds the upper limit of the above range, the impact strength of the product is likely to be unsatisfactory. On the other hand, when the MFR is below the lower limit of the above range, a failure to flow sometimes occurs at the time of molding.

(c) Average elution temperature ($T_{50}$) and elution dispersion (σ) For the propylene polymer according to the present invention, the average elution temperature ($T_{50}$) in an elution curve obtained by temperature rising elution fractionation (TREF) is 75 to 120° C., preferably 75 to 110° C., particularly preferably 75 to 100° C., and the elution dispersion (σ) is not more than 9, preferably not more than 8, particularly preferably not more than 7.7.

The temperature rising elution fractionation (TREF) is carried out as follows. A polymer is fully dissolved at a certain high temperature, and the solution is then cooled to form a thin polymer layer on the surface of an inert carrier. Subsequently, the temperature is raised in a continuous or stepwise manner to recover eluted components (eluted polymers), and the concentration thereof is continuously detected to determine the elution amount and the elution temperature. An elution curve is prepared from the elution amount at each temperature and the elution temperature. The composition distribution of the polymer may be determined from the elution curve. The method and apparatus and other details relating to the temperature rising elution fractionation (TREF) are described in Journal of Applied Polymer Science, Vol. 26, 4217–4231 (1981).

The average elution temperature ($T_{50}$) is the temperature at which the integrated weight of the eluted polymer reaches 50%. When the average elution temperature ($T_{50}$) is below the lower limit of the above temperature range, the molecular weight or the melting point is excessively low. This is causative of unsatisfactory rigidity. On the other hand, when the average elution temperature ($T_{50}$) is above the upper limit of the above temperature range, the molecular weight or the melting point is excessively high. In this case, the moldability is poor.

The elution dispersion (σ) is a value expressed by numerical formula (1), that is, a difference between the temperature ($T_{15.9}$), at which the integrated weight of the eluted polymer reaches 15.9%, and the temperature ($T_{84.1}$), at which the integrated weight of the eluted polymer reaches 84.1%.

$$\sigma = T_{84.1} - T_{15.9} \qquad (1)$$

When the elution dispersion (σ) exceeds the upper limit of the above range, a component having low stereotacticity, which inhibits crystallization, or a portion having a significantly different comonomer composition is increased, disadvantageously resulting in deteriorated rigidity.

(d) Fraction of Isotactic Pentad Chain

The propylene polymer according to the present invention should satisfy the requirements (a) to (c) and, preferably, further satisfies requirement (d) for the fraction of the isotactic pentad chain described below.

Specifically, for the propylene polymer according to the present invention, the fraction (meso-pentad fraction) of the isotactic pentad chain (mmmm), which is the stereotacticity index determined by $^{13}$C-NMR spectrum analysis according to a conventional method, is preferably not less than 95%, preferably not less than 97%. When the stereotacticity is low, the melting point is lowered. This is likely to deteriorate the heat resistance. For some production processes, a minor amount of an atactic polymer component is sometimes present even when (mmmm) as the average value is high The atactic polymer component defined by the boiling heptane soluble content is preferably not more than 5%, more preferably not more than 3%, still more preferably not more than 1%.

(e) Content of 1,3-Regioirregular Bond

The propylene polymer according to the present invention should satisfy the requirements (a) to (c) and, preferably, further satisfy the requirement (d). More preferably, the propylene polymer further satisfies the following requirement (e) for the 1,3-regioirregular content.

Specifically, the propylene polymer according to the present invention preferably has a 1,3 regioirregular content of 0.06 to 3%.

(16) Production Process of Propylene Polymer

The propylene polymer used in the present invention may be produced by any production process without particular limitation so far as a predetermined polymer having properties specified in the present invention can be obtained. For example, the propylene polymer according to the present invention may be produced by polymerization in the presence of a catalyst system described in (I)–(iv) above.

(17) Composition XII

Among the propylene resin compositions according to the present invention, the composition XII is a polypropylene resin composition which is the same as the composition II except that the propylene polymer described in (15) is used instead of the propylene block copolymer in the composition II.

(18) Composition XIII

Among the propylene resin compositions according to the present invention, the composition XIII is a polypropylene resin composition which is the same as the composition III except that the propylene polymer described in (15) is used instead of the propylene block copolymer in the composition III.

(19) Composition XIV

Among the propylene resin compositions according to the present invention, the composition XIV is a polypropylene resin composition which is the same as the composition IV except that the propylene polymer described in (15) is used instead of the propylene block copolymer in the composition IV.

(20) Composition XV

Among the propylene resin compositions according to the present invention, the composition XV is a polypropylene resin composition which is the same as the composition V except that the propylene polymer described in (15) is used instead of the propylene block copolymer in the composition V.

(21) Composition XVI

Among the propylene resin compositions according to the present invention, the composition XVI is a polypropylene resin composition which is the same as the composition VI except that the propylene polymer described in (15) is used instead of the propylene block copolymer in the composition VI.

(22) Composition XVII

Among the propylene resin compositions according to the present invention, the composition XVII is a polypropylene resin composition which is the same as the composition VII except that the propylene polymer described in (15) is used instead of the propylene block copolymer in the composition VII.

(23) Composition XVIII

Among the propylene resin compositions according to the present invention, the composition XVIII is a polypropylene resin composition which is the same as the composition VIII except that the propylene polymer described in (15) is used instead of the propylene block copolymer in the composition VIII.

(24) Composition XIX

Among the propylene resin compositions according to the present invention, the composition XIX is a polypropylene resin composition which is the same as the composition IX except that the propylene polymer described in (15) is used instead of the propylene block copolymer in the composition IX.

(25) Composition XX

Among the propylene resin compositions according to the present invention, the composition XX is a polypropylene resin composition which is the same as the composition X except that the propylene polymer described in (15) is used instead of the propylene block copolymer in the composition X.

(26) Composition XXI

Among the propylene resin compositions according to the present invention, the composition XXI is a polypropylene resin composition which is the same as the composition XI except that the propylene polymer described in (15) is used instead of the propylene block copolymer in the composition XI.

(27) Production of Resin Composition

The propylene resin compositions according to the present invention may be produced by any production process without particular limitation, specifically by compounding the above compounding ingredients with the propylene block copolymer or the propylene polymer and then conducting mixing and melt kneading according to a conventional method.

The mixing and melt kneading may be generally carried out by means of a Henschel mixer, a Super mixer, a V-blender, a tumble mixer, a ribbon mixer, a Banbury mixer, a kneader blender, a roll mixer, a Brabender plastograph, a single screw or twin screw kneader-extruder or the like. Among them, mixing or melt kneading by means of a single screw or twin screw kneader-extruder is preferred.

In kneading and granulation, all the components may be simultaneously kneaded. Alternatively, in order to improve the properties, it is possible to use a method wherein the components are fed and kneaded in a plurality of stages, for example, a method wherein a part or the whole of the propylene block copolymer is first kneaded with an inorganic filler and, thereafter, the remaining components are kneaded followed by granulation.

(16) Molded Product of Propylene Resin

The propylene resin compositions according to the present invention thus obtained may be molded by various conventional methods. For example, injection molding (including gas assisted injection molding), injection compression molding (press injection), extrusion, blow molding, calendering, inflation molding, monoaxially stretched film forming, and biaxially stretched film forming may be used to prepare various molded products. Among them, injection molding and injection compression molding are more preferred.

The propylene resin compositions according to the present invention has highly balanced properties, that is, a high level of balance among rigidity, impact resistance, and heat resistance, and thus can be said to have properties good enough to be put to practical use as molding materials for various industrial components, particularly various molded products having reduced thickness, enhanced function, and increased size, for example, automobile components, such as bumpers, instrument panels, and garnishes, and domestic electric appliance components, such as television cases.

EXAMPLES

The following examples further illustrate the present invention but are not intended to limit it.

In the examples, various properties were determined by the following methods.

(1) MFR (unit: g/10 min) was measured according to JIS K 7210 (230° C., load 2.16 kg) (for polyethylene resin, 190° C. and load 2.16 kg).

(2) The gross average chain length and the block average chain length were determined by $^{13}$C-NMR spectrum analysis according to the gated decoupling method described above.

(3) The stereotacticity (meso-pentad fraction: mmmm in %) was evaluated by a conventional method based on $^{13}$C-NMR spectrum (Randall J. C., Journal Of Polymer Science, 12, 703 (1974).

(4) The content of the rubbery component in the block copolymer was determined as follows. 2 g of a sample was immersed and dissolved in 300 g of boiling xylene for 20 min. The solution was cooled to room temperature. The precipitated solid phase was filtered through a glass filter, and then dried to determine the weight of the solid phase. The content of the rubbery component in the block copolymer was determined from the weight of the solid phase by the reverse calculation.

(5) The content of ethylene in the rubbery component was measured by infrared spectrum analysis.

(6) The weight average molecular weight Mw and the number average molecular weight Mn were measured by GPC.

(7) The 1,3-regioirregular bond was quantitatively determined by determining the attribution of peaks according to A. Zambelli, Macromolecules, 21(3), 617 (1988) and calculating the content of the 1,3-regioirregular bond in terms of % by mole from the total amounts of carbon of —$CH_2$— and —CH—.

(8) The flexural modulus (unit: MPa) was measured at 23° C. according to JIS K 7203.

(9) The Izod impact strength (unit: $kJ/m^2$) was measured at 23° C. and −30° C. according to JIS K 7110.

(10) The deflection temperature under load (unit: ° C.) was measured at 4.6 $kgf/cm^2$ and 18.5 $kgf/cm^2$ according to JIS K 7207.

(11) The warpage was evaluated according to the following method.

A molded product for the evaluation of the warpage (a box-shaped molded product) was placed in a thermostatic chamber (23° C., humidity 50%) for 48 hr. The box-shaped molded product was placed on a flat bench so that the opening of the box faced downward. One short side of the box in its opening face was pressed against the bench, and the maximum value of the distance between the bench and the short side on the opening face of the box in its side, which has not been pressed, was measured as the magnitude of the warpage of the molded product (unit: mm).

(12) Change in MFR (MFR (3)/MFR (1))

For the polymer composition in the form of pellets, the pellets were melt kneaded twice by means of the same extruder as used in the production of the pellets at a heater temperature of 260° C. in an air atmosphere to determine the MFR. Pellets, which had been first granulated at 230° C., were designated as P (1), and pellets, which had been passed through the extruder at 230° C. once and at 260° C. twice, that is, passed through the extruder thrice in total, were designated as P (3). The MFR ratio of P (3) to the P (1) (MFR (3)/MFR (1)) was determined as the change in MFR.

(13) Burning 15 g of the pellets were placed in a heat-resistant glass bottle (internal volume 35 ml), and this bottle was then put on a press heated at 260° C. Heaters provided in the press were allowed to approach respectively from above and below the press to the bottle. The press was surrounded by an aluminum foil to prevent the dissipation of heat from the press. One hr after the initiation of heating, the glass bottle was taken out and visually inspected from above the glass bottle for the degree of burning of the resin in the glass bottle.

◯: The resin not substantially burned.

Δ: The resin slightly burned.

X: The resin considerably burned.

(14) The weathering resistance was measured with a xenon weather-o-meter (Xe-WOM) by the following method.

A test sheet having a size of 120 mm×80 mm×2 mm obtained by injection molding was exposed to conditions of black panel temperature 63° C. and intermittent raining (spraying 12 min/60 min cycle). The surface appearance of the exposed sheet was observed under a microscope (magnification: 60 times) to measure the time of exposure necessary for producing cracking (unit: hr).

(15) The bleeding resistance was evaluated as follows.

The same test sheet (not subjected to the weathering test) as used in the weathering test was placed in a Geer oven regulated at 80° C. for 20 days, and then taken out of the oven to visually inspect the appearance of the test sheet. The results were evaluated according to the following criteria.

◯: Bleeding not observed at all.

◯-: Bleeding was observed on such a low level that does not pose any problem.

Δ: Bleeding is easily observed.

X: Bleeding is observed on such a considerable level that makes it impossible to use the sheet for practical use.

(16) The antistatic property (AS property: after one day) was measured as follows.

A test sheet having a size of 100 mm×100 mm×1 mm was prepared by injection molding, and then allowed to stand for one day in a room under conditions of humidity 50% and temperature 23° C. The sheet was then set in a honest meter, and the antistatic property was measured under the following conditions. Specifically, a voltage was applied for 2 min under the following conditions. After the application of the voltage was stopped, an attenuation curve for a withstanding voltage was recorded for 3 min while rotating a rotary plate. The percentage reduction of the withstanding voltage 3 min after stopping the application of the voltage from the initial withstanding voltage was determined as the percentage attenuation. Further, the time, which had elapsed until the initial withstanding voltage was halved after stopping the application of the voltage, was measured as the half-value period (unit: sec).

[Conditions]

Applied voltage: 10 kV

Rotational speed of rotary plate: 1550 rpm

Distance of top of test sheet from lower end of discharge portion and receiving portion: 20 mm Voltage application time: 2 min

(17) Average elution temperature ($T_{50}$) and elution dispersion ($\sigma$)

The average elution temperature ($T_{50}$, in °C.) and the elution dispersion ($\sigma$) were determined from an elusion curve obtained by temperature rising elution fractionation (TREF). Here the peak of the elution curve obtained by TREF was measured as follows. A polymer was once fully dissolved at a high temperature, and the solution was then cooled to form a thin polymer layer on the surface of an inert carrier contained in the solution. The temperature was then raised continuously or stepwise. At that time, the eluted components were recovered, and the concentration thereof was continuously detected to measure the elution amount and the elution temperature.

The measurement for the elution curve was carried out under the following conditions.

Solvent: o-Dichlorobenzene-Measurement concentration: 4 mg/ml

Injection amount: 0.5 ml

Column: 4.6 mm$\phi$×150 mm

Cooling rate: 100° C.×120 min

Production Example 1

Production of PP-1

(1) Preparation of Components of Catalyst (i) Synthesis of Component (A) (Dimethylsilylenebis{1,1'-(2-methyl-4-phenyl-4-hydroazulenyl)}-hafnium Dichloride):

All the following reactions were carried out in an inert gas atmosphere, and the reaction solvent was previously dried before use.

(a) Synthesis of Mixture of Racemic Form and Meso Form 3.22 g of 2-methylazulene was dissolved in 30 ml of hexane. 21 ml (1.0 equivalent) of a cyclohexane-diethyl ether solution of phenyllithium was added thereto at 0° C. by portions. The solution was then stirred at room temperature for 1.5 hr, and 30 ml of tetrahydrofuran, which had been cooled to –78° C., was added thereto. Thereafter, 45 $\mu$mol of 1-methylimidazole and 1.37 ml of dimethyldichlorosilane were added to the solution. The temperature of the solution was returned to room temperature, followed by stirring for one hr. Thereafter, an aqueous ammonium chloride solution was added, and separation was then carried out. The organic phase was dried over magnesium sulfate. The solvent was removed by distillation under reduced pressure to obtain 5.84 g of crude bis{1,1'-(2-methyl-4-phenyl-1,4-dihydroazulenyl)}-dimethylsilane.

The crude bis{1,1'-(2-methyl-4-phenyl-1,4-dihydroazulenyl)}dimethylsilane thus obtained was dissolved in 30 ml of diethyl ether. 14.2 ml (1.6 mol/L) of a hexane solution of n-butyllithium was added dropwise at –78° C. to the solution. The temperature of the system was gradually returned to room temperature, followed by stirring for 12 hr. The solvent was removed by distillation under the reduced pressure. 80 ml of toluene-diethyl ether (40:1) was added to the residue. 3.3 g of hafnium tetrachloride was added thereto at –60° C. The temperature of the system was gradually returned to room temperature, followed by stirring for 4 hr. The resultant solution was concentrated under reduced pressure. The solid thus obtained was washed with toluene, and then extracted with dichloromethane to give 1.74 g of a mixture of racemic- and meso- dimethylsilylenebis{1,1'-(2-methyl-4-phenyl-4-hydroazulenyl)}hafnium dichloride.

(b) Purification of Racemic Form 1.74 g of the mixture of the racemic form and the meso form, which had been obtained by repeating the above reaction, was dissolved in 30 ml of dichloromethane. The solution was introduced into a Pyrex glass container provided with a 100-W high-pressure mercury lamp, and was exposed to light with stirring for 40 min under atmospheric pressure to enhance the proportion of the racemic form. Dichloromethane was then removed by distillation under reduced pressure. 10 ml of toluene was added to the resultant yellow solid, followed by stirring. The mixture was filtered. The collected solid matter was washed with 8 ml of toluene and 4 ml of hexane to give 917 mg of racemic dimethylsilylenebis{1,1'-(2-methyl-4-phenyl-4-hydroazulenyl)}hafnium dichloride.

(ii) Production of Component (B):

135 ml of desalted water and 16 g of magnesium sulfate were placed in a 500-ml round bottom flask, and the system was then stirred to dissolve the contents. 22.2 g of montmorillonite (Kunipia F, manufactured by Kunimine Industries Co., Ltd.) was added to the solution. The mixture was heated to 80° C., and treated at that temperature for one hr. 300 ml of desalted water was added thereto, followed by filtration to recover the solid matter.

46 ml of desalted water, 23.4 g of sulfuric acid, and 29.2 g of magnesium sulfate were added to the solid matter. The mixture was heated under reflux for 2 hr. After the treatment, 200 ml of desalted water was added, followed by filtration. Further, 400 ml of desalted water was added thereto, followed by filtration. This procedure was repeated twice. The product was dried at 100° C. to prepare a chemically treated montmorillonite.

1.05 g of the chemically treated montmorillonite was placed in a 100-ml round bottom flask, and dried at 200° C. for 2 hr under reduced pressure. 3.5 ml of a toluene solution (0.5 mmol/ml) of triethylaluminum was added thereto under purified nitrogen. The mixture was allowed to react at room temperature for one hr. The reaction mixture was then washed twice with 30 ml of toluene to prepare component (B) as a toluene slurry.

(iii) Preparation of Catalyst

To the whole quantity of the toluene slurry were added a toluene solution (0.5 mmol/ml): 0.6 ml of triisobutylaluminum and a toluene solution (1.5 $\mu$mol/ml): 19.1 ml of the racemic dimethylsilylenebis{1,1'-(2-methyl-4-phenyl-4-hydroazulenyl)}hafnium dichloride synthesized in step (i), followed by contacting at room temperature for 10 min.

(2) Prepolymerization of Propylene 40 ml of toluene and the whole quantity of the contact product obtained in step (iii) as a prepolymerization catalyst were introduced into a 2-L induction stirring type autoclave under purified nitrogen. Propylene was introduced into the system with stirring, followed by prepolymerization at room temperature at a total polymerization pressure of 0.6 MPa for 3 min. Next, propylene remaining unreacted was purged, and the atmosphere in the autoclave was replaced under pressure by purified nitrogen. The prepolymerized catalyst component was then taken out of the autoclave. This contained 2.98 g of polymer per g of component (B).

(3) Polymerization of Propylene 0.6 ml of a toluene solution (0.5 mmol/ml) of triisobutylaluminum was added to a 2-L induction stirring type autoclave (the air in the autoclave having been replaced by purified nitrogen) with a built-in anchor impeller. A hydrogen gas (13.1 KPa) was charged into the autoclave, and 700 g of liquefied propylene was then charged. Thereafter, 37.5 mg of the prepolymerized catalyst component obtained in step (2) was introduced as a solid catalyst component under pressure into the system. The system was then heated, and polymerization was carried out at 75° C. for 30 min. Propylene and hydrogen were then purged to complete a first stage polymerization.

The polymer obtained in the first stage polymerization was weighed. As a result, it was found that 293 g of polypropylene was obtained. 53 g of the polymer was withdrawn under a stream of purified nitrogen. The temperature was then raised to 60° C. while mixing with stirring. After raising the temperature to 60° C., a propylene gas and an ethylene gas were charged to a total polymerization pressure of 1.96 MPa to initiate a second stage polymerization. While a mixed gas composed of propylene and ethylene was fed so as to maintain the total polymerization pressure at 1.96 MPa, the polymerization was carried out at 60° C. for 150 min. The proportion of propylene [propylene/(propylene+ethylene)] was 30% by mole on average.

Thereafter, propylene and ethylene were purged to give 258 g of a propylene block copolymer (PP-1) as a white powder. The block copolymer thus obtained had an MFR of 30.

The content of the polymer (rubbery component), obtained in the second stage polymerization, in the block copolymer was 7% by weight.

The polypropylene obtained in the first stage polymerization had an MFR of 42, a stereotacticity (mmmm) of 99.3%, a 1,3-regioirregular bond of 0.5%, an Mw of 150,000, and an Mw/Mn of 3.1.

For the block copolymer, the gross average chain length of ethylene in the second stage polymerization was 2.82, and the average chain length of block ethylene was 3.67.

Production Example 2

Production of PP-2

0.6 ml of a toluene solution (0.5 mmol/ml) of triisobutylaluminum was added to a 2-L induction stirring type autoclave (the air in the autoclave having been replaced by purified nitrogen) with a built-in anchor impeller. A hydrogen gas (13 KPa) was charged into the autoclave, and 700 g of liquefied propylene was then charged. Thereafter, 37.5 mg of the prepolymerized catalyst component obtained in step (2) in Production Example 1 was introduced as a solid catalyst component under pressure into the system. The system was then heated, and polymerization was carried out at 75° C. for 30 min. Propylene and hydrogen were then purged to complete first stage polymerization. The polymer obtained in the first stage polymerization was weighed. As a result, it was found that 296 g of polypropylene was obtained.

79 g of the polymer obtained in the first stage polymerization, polypropylene, was withdrawn under a stream of purified nitrogen. The temperature was then raised to 60° C. while mixing with stirring. After raising the temperature to 60° C., a propylene gas and an ethylene gas were charged to a total polymerization pressure of 1.96 MPa to initiate a second stage polymerization. While a mixed gas composed of propylene and ethylene was fed so as to maintain the total polymerization pressure at 1.96 MPa, the polymerization was carried out at 60° C. for 100 min. The proportion of propylene [propylene/(propylene+ethylene)] was 45.4% by mole on average.

Thereafter, propylene and ethylene were purged to give 274 g of a propylene block copolymer (PP-2) as a white powder. The block copolymer thus obtained had an MFR of 12.4.

The content of the polymer (content of rubber), obtained in the second stage polymerization, in the block copolymer was 20.8% by weight.

The polypropylene obtained in the first stage polymerization had an MFR of 36.0, a stereotacticity (mmmm) of 99.2%, a 1,3-=regioirregular bond of 0.5%, an Mw of 180,000, and an Mw/Mn (Q value) of 3.

For the block copolymer, the gross average chain length of ethylene in the polymer obtained in the second stage polymerization was 1.87, and the average chain length of block ethylene was 2.80.

The rigidity and the Izod impact strength are summarized in Table 2.

Production Example 3

Production of PP-3

(1) Synthesis of Component (A) (Dimethylsilylenebis[1,1'-{2-methyl-4-(4-chlorophenyl)-4-hydroazulenyl}]hafnium Dichloride:

29 ml of a pentane solution (1.64 M) (47.0 mmol) of t-butyllithium was added dropwise at −78° C. to a solution of 4.5 g (23.53 mmol) of 1-boromo-4-chlorobenzene in n-hexane (30 ml) and diethyl ether (30 ml). The mixed solution was then stirred at −5° C. for 1.5 hr. 3.0 g (21.2 mmol) of 2-methylazulene was added to this solution, and a reaction was allowed to proceed. The reaction solution was stirred for one hr while gradually returning the temperature of the solution to room temperature.

Thereafter, the reaction solution was cooled to −5° C., and 40 μl (0.47 mmol) of 1-methylimidazole was added to the solution. Further, 1.28 ml (10.59 mmol) of dichlorodimethylsilane was added thereto. After the reaction solution was stirred at room temperature for 1.5 hr, dilute hydrochloric acid was added to stop the reaction. The separated organic phase was concentrated under reduced pressure. The solvent was removed by distillation, and the residue was then purified by chromatography on a silica gel column to give 2.74 g of an amorphous solid.

The reaction product was then dissolved in 20 ml of dry diethyl ether, and 6.3 ml (9.72 mmol) of an n-hexane solution (1.54 M) of n-butyllithium was added dropwise at −78° C. to the solution. After the completion of the dropwise addition, the reaction solution was stirred for 12 hr while gradually returning the temperature of the reaction solution to room temperature. The solvent was removed by distillation under reduced pressure. 5 ml of a mixed solvent composed of dry toluene and dry diethyl ether (40:1) was then added to the residue. The mixture was cooled to −78° C., and 1.56 g (4.86 mmol) of hafnium tetrachloride was added thereto. Thereafter, the temperature of the mixture was immediately returned to room temperature, followed by a reaction with stirring for 4 hr. The reaction solution thus obtained was filtered through Celite, and the collected solid was extracted with dichloromethane (90 ml). The solvent was removed from the extract by distillation to give 320 mg (yield 7%) of racemic dimethylsilylenebis[1,1'-{2-methyl-4-(4-chlorophenyl)-4-hydroazulenyl}]hafnium dichloride.

$^1$H-NMR chemical shifts of the racemic compound were as follows:

300 MHz, CDCl$_3$ (ppm): δ 0.95 (s, 6H, SiMe$_2$) 2.21 (s, 6H, 2-Me), 4.92–4.96 (br d, 2H), 5.70–6.15 (m, 8H), 6.78 (d, 2H), 7.8 (s, 8H, arom)

(2) Production of Component (B) (Chemical Treatment and Granulation of Clay Mineral):

3 kg of commercially available montmorillonite (Kunipia F, manufactured by Kunimine Industries Co., Ltd.) was vibration milled, and then dispersed in 16 L of a 3% aqueous sulfuric acid solution. 2.1 kg of magnesium sulfate was added to the dispersion, and the mixture was then stirred at 90° C. for 3 hr. Thereafter, the solid was collected by filtration, washed with water, and then adjusted to a pH value of not less than 5. A slurry having a solid content of 15% was prepared, and then spray granulated by means of a spray drier. The particles thus obtained were spherical. 10.0 g of the chemically treated montmorillonite thus obtained was placed in a 200-ml flask, and then heat dehydrated at 300° C. for 2 hr under reduced pressure to obtain component (B).

(3) Preparation of Solid Catalyst Component and Prepolymerization:

400 ml of heptane was introduced into a 1-L stirring type autoclave, and the temperature of the mixture was regulated to 40° C. Separately, 10 g of the component (B) obtained in step (2) just above was dispersed in 40.2 ml of toluene. 79.8 ml (corresponding to 60 mmol) of triethylaluminum diluted with toluene was added, followed by contacting at room temperature for one hr. The supernatant was withdrawn, and the solid matter was washed with toluene, and then introduced into the autoclave.

48.8 ml (corresponding to 0.10 mmol) of a toluene solution of dimethylsilylenebis[1,1'-{2-methyl-4-(4-chlorophenyl)-4-hydroazulenyl}]hafnium dichloride obtained in step (1) in this production example was then introduced. Further, 4.96 ml (corresponding to 4 mmol) of triisobutylaluminum diluted with toluene was added dropwise thereto, and propylene was fed to initiate polymerization. The polymerization was carried out for 15 min while maintaining the pressure of propylene at 5 kgf/cm$^2$G. After the polymerization, the polymer slurry was withdrawn. The supernatant was removed, followed by drying at 40° C. for 3 hr under reduced pressure to prepare a dried catalyst. The amount of the prepolymer was 3.1 g per g of the component (B).

(4) Block Copolymerization of Propylene:

0.6 ml of a toluene solution (0.5 mmol/ml) of triisobutylaluminum was added to a 2-L induction stirring type autoclave (the air in the autoclave having been replaced by purified nitrogen) with a built-in anchor impeller. A hydrogen gas (13 KPa) was charged into the autoclave, and 700 g of liquefied propylene was then charged. Thereafter, 37.5 mg of the prepolymerized catalyst component prepared just above was introduced as a solid catalyst component under pressure into the system. The system was then heated, and polymerization was carried out at 75° C. for 30 ml-n. Propylene and hydrogen were then purged to complete a first stage polymerization. The polymer obtained in the first stage polymerization was weighed. As a result, it was found that 403 g of polypropylene was obtained.

180 g of the polymer obtained in the first stage polymerization, polypropylene, was withdrawn under a stream of purified nitrogen. The temperature was then raised to 60° C. while mixing with stirring. After raising the temperature to 60° C., a propylene gas and an ethylene gas were charged to a total polymerization pressure of 1.96 MPa to initiate a second stage polymerization.

While a mixed gas composed of propylene and ethylene was fed so as to maintain the total polymerization pressure at 1.96 MPa, the polymerization was carried out at 60° C. for 100 min. The proportion of propylene [propylene/(propylene+ethylene)] was 43.7% by mole on average.

Thereafter, propylene and ethylene were purged to give 328 g of a propylene block copolymer (PP-3) as a white powder. The block copolymer thus obtained had an MFR of 7.4.

The content of the polymer obtained in the second stage polymerization (rubber content) in the block copolymer was 16.8% by weight.

The polypropylene obtained in the first stage polymerization had an MFR of 10.1, a stereotacticity (mmmm) of 99.4%, a 1,3-regioirregular bond of 0.3%, an Mw of 180,000, and an Mw/Mn (Q value) of 3.1.

For the block copolymer, the gross average chain length of ethylene in the polymer obtained in the second stage polymerization was 1.75, and the average chain length of block ethylene was 2.59.

Production Example 4

Production of PP-4

0.6 ml of a toluene solution (0.5 mmol/ml) of triisobutylaluminum was added to a 2-L induction stirring type autoclave (the air in the autoclave having been replaced by purified nitrogen) with a built-in anchor impeller. A hydrogen gas (15 KPa) was charged into the autoclave, and 700 g of liquefied propylene was then charged. Thereafter, 37.5 mg of the prepolymerized catalyst component obtained in step (2) in Production Example 1 was introduced as a solid catalyst component under pressure into the system. The system was then heated, and polymerization was carried out at 75° C. for 30 min. Propylene and hydrogen were then purged to complete a first stage polymerization.

The polymer obtained in the first stage polymerization was weighed. As a result, it was found that 350 g of polypropylene was obtained. 110 g of the polymer was withdrawn under a stream of purified nitrogen. The temperature was then raised to 60° C. while mixing with stirring. After raising the temperature to 60° C., a propylene gas and an ethylene gas were charged to a total polymerization pressure of 1.96 MPa to initiate a second stage polymerization. While a mixed gas composed of propylene and ethylene was fed so as to maintain the total polymerization pressure at 1.96 MPa, the polymerization was carried out at 60° C. for 270 min. The proportion of propylene [propylene/(propylene+ethylene)] was 35% by mole on average.

Thereafter, propylene and ethylene were purged to give 320 g of a propylene block copolymer (PP-4) as a white powder. The block copolymer thus obtained had an MFR value of 30.

The content of the polymer (rubbery component), obtained in the second stage polymerization, in the block copolymer was 25% by weight. The polypropylene obtained in the first stage polymerization had a stereotacticity (mmmm) of 99.3%, a 1,3-regioirregular bond of 0.5%, and an Mw/Mn of 3.0.

For the block copolymer, the gross average chain length of ethylene in the second stage polymerization was 1.95, and the average chain length of block ethylene was 2.72.

Production Example 5

Production of PP-5

[Synthesis of Catalyst]

A solid catalyst component (1) was synthesized according to the process described in Example 1 of Japanese Patent Laid-Open No. 234707/1991.

[Polymerization]

The air in a stirring type autoclave having an internal volume of 200 liters was thoroughly replaced by propylene. Thereafter, 60 liters of dehydrated and deoxygenated n-heptane was introduced into the autoclave, and 10.5 g of triethylaluminum and 3.2 g of the solid catalyst component (1) synthesized above were introduced under a propylene atmosphere of 70° C.

Polymerization was carried out in two stages. The first stage polymerization was initiated by raising the temperature of the autoclave to 75° C. and then introducing propylene at a rate of 9 kg/hr while maintaining the concentration of hydrogen in a gas phase portion at 7.2% by volume 231 min after the initiation of the polymerization, the introduction of propylene was stopped, and the polymerization was continued while maintaining the temperature at 75° C. until the internal pressure of the autoclave became 2.0 kg/cm$^2$·G. Thereafter, the residual gas was purged until the pressure of propylene in the gas phase portion became 0.4 kg/cm$^2$ ·G.

The temperature of the autoclave was then decreased to 65° C., and the second stage polymerization was carried out by introducing propylene at a rate of 3.78 kg/hr and ethylene at a rate of 2.52 kg/hr for 42 min.

Butanol was added to the resultant slurry to decompose the catalyst, followed by filtration and drying to give 33.8 kg of a powdery propylene-ethylene block copolymer (PP-5) having MFR=30 g/10 min.

Production Example 6

Production of PP-6

The air in a stirring type autoclave having an internal volume of 200 liters was thoroughly replaced by propylene. Thereafter, 60 liters of dehydrated and deoxygenated n-heptane was introduced into the autoclave, and 45 g of diethylaluminum chloride and 12 g of a titanium trichloride catalyst (catalyst 01) manufactured by M & S Catalyst were introduced under a propylene atmosphere of 60° C.

Polymerization was carried out in two stages. The first stage polymerization was initiated by raising the temperature of the autoclave to 65° C. and then introducing propylene at a rate of 9 kg/hr while maintaining the concentration of hydrogen in a gas phase portion at 8.8% by volume. 190 min after the initiation of the polymerization, the introduction of propylene was stopped, and the polymerization was continued while maintaining the temperature at 65° C. until the internal pressure of the autoclave became 2.0 kg/cm$^2$ ·G. Thereafter, the residual gas was purged until the pressure of propylene in the gas phase portion became 0.4 kg/cm$^2$·G.

The temperature of the autoclave was then decreased to 60° C., and the second stage polymerization was carried out by introducing propylene at a rate of 3.16 kg/hr and ethylene at a rate of 1.35 kg/hr for 126 min.

Butanol was added to the resultant slurry to decompose the catalyst, followed by filtration and drying to give 32.8 kg of a powdery propylene-ethylene block copolymer (PP-6) having MFR=10 g/10 min and a rubber content of 19% by weight. The rigidity and Izod impact strength values are summarized in Table 2.

Production Example 7

Production of PP-8
[Synthesis of Catalyst]
A solid catalyst component (1) was synthesized according to the process described in Example 1 of Japanese Patent Laid-Open No. 234707/1991.
[Polymerization]
The air in a stirring type autoclave having an internal volume of 200 liters was thoroughly replaced by propylene. Thereafter, 60 liters of dehydrated and deoxygenated n-heptane was introduced into the autoclave, and 10.5 g of triethylaluminum, 4.2 g of dicyclopentyldimethoxysilane, and 3.6 g of the solid catalyst component (1) synthesized above were introduced under a propylene atmosphere of 70° C.

Thereafter, the temperature of the autoclave was raised to 75° C. Propylene was fed at a rate of 9 kg/hr for 3 hr while maintaining the concentration of hydrogen in the gas phase portion at 18% by volume. After the completion of the feed of propylene, the polymerization was continued for additional one hr.

Thereafter, the residual gas was purged, and butanol was added to stop the reaction. The product was filtered and dried. Thus, 28.5 kg of a homopolymer of propylene (PP-8) having MFR=30.6 g/10 min was obtained.

Production Example 8

Production of PP-9
[Synthesis of Catalyst]
A solid catalyst component (1) was synthesized according to the process described in Example 1 of Japanese Patent Laid-Open No. 234707/1991.
[Polymerization]
The air in a stirring type autoclave having an internal volume of 200 liters was thoroughly replaced by propylene. Thereafter, 60 liters of dehydrated and deoxygenated n-heptane was introduced into the autoclave, 10.5 g of triethylaluminum, 4.2 g of dicyclopentyldimethoxysilane, and 4.1 g of the solid catalyst component (1) synthesized above were introduced under a propylene atmosphere of 70° C.

Polymerization was carried out in two stages. The first stage polymerization was initiated by raising the temperature of the autoclave to 75° C. and then introducing propylene at a rate of 9 kg/hr while maintaining the concentration of hydrogen in a gas phase portion at 28% by volume. 237 min after the initiation of the polymerization, the introduction of propylene was stopped, and the polymerization was continued while maintaining the temperature at 75° C. until the internal pressure of the autoclave became 3.0 kg/cm$^2$·G. Thereafter, the residual gas was purged until the pressure of propylene in the gas phase portion became 0.3 kg/cm$^2$ ·G.

The temperature of the autoclave was then decreased to 65° C., 3.4 g of n-butanol was added thereto, and the second stage polymerization was carried out by introducing propylene at a rate of 2.67 kg/hr and ethylene at a rate of 1.78 kg/hr for 53 min.

Butanol was added to the resultant slurry to decompose the catalyst, followed by filtration and drying to give 29.3 kg of a powdery propylene-ethylene block copolymer (PP-9) having MFR=65 g/10 min.

Production Example 9

Production of PP-10

0.6 ml of a toluene solution (0.5 mmol/ml) of triisobutylaluminum was added to a 2-L induction stirring type autoclave (the air in the autoclave having been replaced by purified nitrogen) with a built-in anchor impeller. A hydrogen gas (13.5 KPa) was charged into the autoclave, and 700 g of liquefied propylene was then charged. Thereafter, 37.5 mg of the prepolymerized catalyst component obtained in step (2) in Production Example 1 was introduced as a solid catalyst component under pressure into the system. The system was then heated, and polymerization was carried out at 75° C. for 30 min. Propylene and hydrogen were then purged to complete the polymerization. The polymer thus obtained was weighed. As a result, it was found that 318 g of polypropylene was obtained. The polypropylene (PP-10) had an MFR value of 30.

Production Example 10

Production of PP-11

[Synthesis of Catalyst]

A solid catalyst component (1) was synthesized according to the process described in Example 1 of Japanese Patent Laid-Open No. 234707/1991.

[Polymerization]

The air in a stirring type autoclave having an internal volume of 200 liters was thoroughly replaced by propylene. Thereafter, 60 liters of dehydrated and deoxygenated n-heptane was introduced into the autoclave, and 10.5 g of triethylaluminum and 2.7 g of the solid catalyst component (1) synthesized above were introduced under a propylene atmosphere of 70° C.

Thereafter, the temperature of the autoclave was raised to 75° C. Propylene was fed at a rate of 9 kg/hr for 3 hr while maintaining the concentration of hydrogen in the gas phase portion at 6.5% by volume. After the completion of the feed of propylene, the polymerization was continued for additional one hr.

Thereafter, the residual gas was purged, and butanol was added to stop the reaction. The product was filtered and dried. Thus, 30 kg of a homopolymer of propylene (PP-11) having MFR=29.7 g/10 min was obtained.

Production Example 11

Production of PP-12

[Synthesis of Catalyst]

A solid catalyst component (1) was synthesized according to the process described in Example 1 of Japanese Patent Laid-Open No. 234707/1991.

[Polymerization]

The air in a stirring type autoclave having an internal volume of 200 liters was thoroughly replaced by propylene. Thereafter, 60 liters of dehydrated and deoxygenated n-heptane was introduced into the autoclave, and 10.5 g of triethylaluminum, 4.2 g of dicyclopentyldimethoxysilane, and 3.6 g of the solid catalyst component (1) synthesized above were introduced under a propylene atmosphere of 70° C.

Thereafter, the temperature of the autoclave was raised to 75° C. Propylene was fed at rate of 9 kg/hr for 3 hr while maintaining the concentration of hydrogen in the gas phase portion at 18% by volume. After the completion of the feed of propylene, the polymerization was continued for additional one hr.

Thereafter, the residual gas was purged, and butanol was added to stop the reaction. The product was filtered and dried. Thus, 28.5 kg of a homopolymer of propylene (PP-12) having MFR=30.6 g/10 min was obtained.

Example 1

(1) Preparation of Propylene Resin Composition 0.1 part by weight of sodium 2,2-methylene-bis(4,6-di-t-butylphenyl)phosphate (tradename NA11, manufactured by Asahi Denka Kogyo Ltd.) as a nucleating agent, 0.05 part by weight of pentaerythrityl-tetrakis[3-(3,5-di-t-butyl-4-hydroxyphenyl)propionate], 0.05 part by weight of tris(2,4-di-t-butylphenyl) phosphite, and 0.05 part by weight of calcium stearate were added to 100 parts by weight of the propylene block copolymer (PP-1) prepared in Production Example 1, followed by mixing with Super Mixer. The mixture was then melt-kneaded at 240° C. by means of a single screw extruder (screw diameter 30 mm) to prepare a composition in a pellet form. Various properties of PP-1 are shown in Table 1.

(2) Preparation of Molded Product

The composition thus obtained was introduced into an injection molding machine having a mold temperature of 40° C. and a cylinder temperature of 240° C., and injection molded to prepare a molded product for a bending test (90 mm×10 mm×4 mm). The flexural modulus was measured in the same manner as described above, and then evaluated. The results are shown in Table 2.

The composition was injection molded using a box-shaped mold having a size of 31 cm×20 cm×2 cm (thickness 0.2 cm) under the following molding conditions to prepare a molded product for the evaluation of warpage (a box-shaped molded product). The box-shaped molded product was evaluated for warpage properties in the same manner as described above. The results are shown in Table 2.

[Molding Conditions]

Molding machine: Injection molding machine IS170, manufactured by Toshiba Corp.

Molding temperature: 220° C.

Injection time: 5 sec

Injection pressure: Primary 1500 kg/cm$^2$, secondary 400 kg/cm$^2$

Cooling time: 15 sec

Mold time: 30° C.

Screw speed: 72 rpm

Example 2

A composition was prepared in the same manner as in Example 1, except that 0.1 part by weight of aluminum hydroxy-di(t-butylbenzoate) (manufactured by Shell, tradename: PTBBA) was used as the nucleating agent. The composition thus obtained was injection molded in the same manner as in Example 1 to prepare a specimen which was then evaluated for flexural modulus and warpage. The results are shown in Table 2.

Example 3

A composition was prepared in the same manner as in Example 1, except that 0.4 part by weight of a magnesium salt of rosin (tradename PINECRYSTAL KM 1500, manufactured by Arakawa Chemical Industries, Ltd.) as the nucleating agent. The composition thus obtained was injection molded in the same manner as in Example 1 to prepare a specimen which was then evaluated for flexural modulus and warpage. The results are shown in Table 2.

Comparative Example 1

A composition was prepared in the same manner as in Example 1, except that 0.2 part by weight of 1,3,2,4-di-p-methylbenzylidenesorbitol (tradename GEL ALL MD, manufactured by New Japan Chemical Co., Ltd.) was used as the nucleating agent. The composition thus obtained was injection molded in the same manner as in Example 1 to prepare a specimen which was then evaluated for flexural modulus and warpage. The results are shown in Table 2.

Comparative Example 2

A composition was prepared in the same manner as in Example 1, except that no nucleating agent was incorporated. The composition thus obtained was injection molded in the same manner as in Example 1 to prepare a specimen which was then evaluated for flexural modulus and warpage. The results are shown in Table 2.

Comparative Example 3

A composition was prepared in the same manner as in Example 1, except that the block copolymer was changed to PP-5. The composition thus obtained was injection molded in the same manner as in Example 1 to prepare a specimen which was then evaluated for flexural modulus and warpage. The results are shown in Table 2. Various properties of PP-5 are shown in Table 1.

Comparative Example 4

A composition was prepared in the same manner as in Example 2, except that the block copolymer was changed to PP-5 used in Comparative Example 3. The composition thus obtained was injection molded in the same manner as in Example 2 to prepare a specimen which was then evaluated for flexural modulus and warpage. The results are shown in Table 2.

compound, 0.05 part by weight of tetrakis(2,4-di-t-butylphenyl)-4,4'-biphenylenediphosphonite (SANDOSTAB PEP-Q manufactured by Sandoz K. K., melting point about 75° C.) as an aromatic phosphoric ester compound, and 0.05 part by weight of calcium stearate were added to 100 parts by weight of the propylene block copolymer (PP-2) prepared in Production Example 2, followed by mixing by means of Super Mixer. The mixture was melt kneaded at 230° C. by means of a single screw extruder (screw diameter 30 mm) in a nitrogen atmosphere to prepare a polymer composition in a pellet form.

The results for the polymer composition in a pellet from thus obtained are shown in Table 3.

Various properties of PP-2 are shown in Table 1.

Example 5

The hindered phenol compound, aromatic phosphoric ester compound, and calcium stearate as used in Example 4 each were compounded in an amount of 0.05 part by weight with 100 parts by weight of the propylene block copolymer (PP-3) prepared in Production Example 3, followed by melt

TABLE 1

|  | PP-1 | PP-2 | PP-3 | PP-4 | PP-5 | PP-6 | PP-7 | PP-8 | PP-9 |
| --- | --- | --- | --- | --- | --- | --- | --- | --- | --- |
| Type of catalyst | Metallocene | Metallocene | Metallocene | Metallocene | Ziegler | Ziegler | Ziegler | Ziegler | Ziegler |
| Type of polymer (*1) | Block co. | Block co. | Block co. | Block co. | Block co. | Block co. | Block co. | Homo. | Block co. |
| MFR, g/10 min | 30 | 12.4 | 7.4 | 30 | 30 | 10 | 30 | 30.6 | 65 |
| mmmm, % | 99.3 | 99.2 | 99.4 | 99.3 | 98.0 | 97 | 98.0 | 99.2 | 99.2 |
| 1,3-Regioirregular bond, % | 0.5 | 0.5 | 0.3 | 0.5 | <0.02 | <0.02 | <0.02 | <0.02 | <0.02 |
| Mw (×10$^5$) | 1.5 | 1.8 | 1.8 | 1.2 | 1.7 | 1.4 | 1.3 | 1.8 | 1.2 |
| Q value (Mw/Mn) | 3.1 | 3.0 | 3.1 | 3.0 | 5.1 | 5.7 | 5.0 | 5.0 | 5.0 |
| Rubber content, wt % | 7 | 20.8 | 16.8 | 25 | 7 | 19 | 25 | — | 7 |
| Ethylene content, mol % (*2) | 69 |  |  | 50 | 69 | 39 | 50 | — | 50 |
| Total chain length of ethylene | 2.82 | 1.87 | 1.75 | 1.95 | 2.95 | 2.22 | 2.26 | — | 2.27 |
| Average chain length of block | 3.67 | 2.80 | 2.59 | 2.72 | 5.22 | 4.20 | 4.28 | — | 4.29 |

(*1) Homo.: Homopolymer, Block co.: Block copolymer
(*2) Ethylene content: Content of ethylene in polymer (rubbery component) obtained in the second stage

TABLE 2

|  |  | Production EX. 2 | Production EX. 6 | EX. 1 | EX. 2 | EX. 3 | Comp. Ex. 1 | Comp. Ex. 2 | Comp. Ex. 3 | Comp. Ex. 4 |
| --- | --- | --- | --- | --- | --- | --- | --- | --- | --- | --- |
|  | Type of polymer | PP-2 | PP-6 | PP-1 | PP-1 | PP-1 | PP-1 | PP-1 | PP-5 | PP-5 |
| Compounding ingredients | A-1 | — | — | 0.1 | — | — | — | — | 0.1 | — |
|  | A-2 | — | — | — | 0.1 | — | — | — | — | 0.1 |
|  | A-3 | — | — | — | — | 0.4 | — | — | — | — |
|  | B-1 | — | — | — | — | — | 0.2 | — | — | — |
| Evaluation | Flexural modulus | 820 | 980 | 1600 | 1400 | 1550 | 1300 | 1200 | 1600 | 1380 |
|  | Warpage | | | 14 | 10 | 8 | 23 | 5 | 40 | 35 |
|  | Izod strength, | | | | | | | | | |
|  | 23° C. | NB | 13.8 | — | — | — | — | — | — | — |
|  | −30° C. | 7.5 | 3.8 | — | — | — | — | — | — | — |

In Table 2, compounding ingredients A-1 to A-3 and B-1 respectively represent the following compounds.

A-1: Sodium 2,2-methylene-bis(4,6-di-t-butylphenyl) phosphate

A-2: Aluminum hydroxy-di(t-butylbenzoate)

A-3: Magnesium salt of rosin

B-1: 1,3,2,4-Di-p-methyl-benzylidene sorbitol

Example 4

0.05 part by weight of pentaerythrityl-tetrakis[3-(3,5-di-t-butyl-4-hydroxyphenyl)propionate] (IRGANOX 1010, manufactured by Ciba-Geigy Limited) as a hindered phenol kneading in the same manner as in Example 4 to prepare a composition in a pellet form.

The composition thus obtained was evaluated for a percentage change of MFR and burning in the same manner as in Example 4. The results are shown in Table 3. Various properties of PP-3 are shown in Table 1.

Example 6

A composition was prepared in the same manner as in Example 5, except that 0.05 part by weight of tris(2,4-di-t-butylphenyl) phosphite (IRGANOX 168 manufactured by Ciba-Geigy Limited, melting point 183° C.) was used as the aromatic phosphoric ester compound. The composition was evaluated for a percentage change of MFR and burning. The results are shown in Table 3.

Example 7

A composition was prepared in the same manner as in Example 5, except 0.05 part by weight of 3,9-bis{2-[3-(3-t-butyl-4-hydroxy-5-methylphenyl)propionyloxy]-1,1-dimethylethyl}-2,4,8,10-tetraoxaspiro[5,5]undecane (A

Comparative Example 9

A composition was prepared in the same manner as in Example 6, except that PP-6 prepared in Comparative Example 8 was used instead of the block copolymer. The composition was evaluated for a percentage change of MFR and burning. The results are shown in Table 3. Various properties of PP-6 are shown in Table 1.

TABLE 3

|  |  | EX. 4 | EX. 5 | EX. 6 | EX. 7 | Comp. Ex. 5 | Comp. Ex. 6 | Comp. Ex. 7 | Comp. Ex. 8 | Comp. Ex. 9 |
|---|---|---|---|---|---|---|---|---|---|---|
|  | Type of polymer | PP-2 | PP-3 | PP-3 | PP-3 | PP-3 | PP-3 | PP-3 | PP-6 | PP-6 |
| Compounding | C-1 | 0.05 | 0.05 | 0.05 | — | 0.05 | 0.05 | — | 0.05 | 0.05 |
| ingredients | C-2 | — | — | — | 0.05 | — | — | — | — | — |
|  | D-1 | 0.05 | 0.05 | — | 0.05 | — | — | — | 0.05 | — |
|  | D-2 | — | — | 0.05 | — | — | — | — | — | 0.05 |
|  | D-3 | — | — | — | — | 0.05 | — | — | — | — |
|  | D-4 | — | — | — | — | — | 0.05 | — | — | — |
| Evaluation | MFR(3)/MFR(1) | 1.3 | 1.2 | 1.4 | 1.2 | 2.2 | 2.3 | 3.3 | 1.7 | 1.9 |
|  | Burning | ○ | ○ | ○ | ○ | Δ | x | Δ | ○ | ○ |

080, manufactured by Asahi Denka Kogyo Ltd.) was used as the hindered phenol compound. The composition was evaluated for a percentage change of MFR and burning. The results are shown in Table 3.

Comparative Example 5

A composition was prepared in the same manner as in Example 5, except that 0.05 part by weight of tris(mixed and dinonylphenyl)phosphite (M 329 manufactured by Asahi Denka Kogyo Ltd., liquid at room temperature) was used as the aromatic phosphoric ester compound. The composition was evaluated for a percentage change of MFR and burning. The results are shown in Table 3.

Comparative Example 6

A composition was prepared in the same manner as in Example 5, except that 0.05 part by weight of distearyl-pentaerythritol-diphosphite (w 618 manufactured by Borg-Warner Automotive, melting point 40 to 70° C.) was used as the aromatic phosphoric ester compound. The composition was injection molded to prepare a specimen which was then evaluated for "burning." The results are shown in Table 3.

Comparative Example 7

The percentage change of MFR and the burning were evaluated in the same manner as in Example 5, except that neither the aromatic phosphoric ester compound nor the hindered phenol compound was compound. The results are shown in Table 3.

Comparative Example 8

A composition was prepared in the same manner as in Example 4, except that the polypropylene PP-6 prepared above was used instead of the block copolymer in Example 4. The composition was evaluated for a percentage change of MFR and burning. The results are shown in Table 3.

In Table 3, compounding ingredients C-1 and C-2 and D-1 to D-4 respectively represent the following compounds.

C-1: Pentaerythrityl-tetrakis[3-(3,5-di-t-butyl-4-hydroxyphenyl)propionate]

C-2: 3,9-Bis{2-[3-(3-t-butyl-4-hydroxy-5-methylphenyl)propionyloxy]-1,1-dimethylethyl}-2,4,8-10-tetraoxaspiro[5,5]undecane D-1: Tetrakis(2,4-di-t-butylphenyl)-4,4'-bi-phenylene diphosphonite D-2: Tris(2,4-di-t-butylphenyl) phosphite D-3: Tris(mixed and dinonylphenyl) phosphite D-4: Distearyl-pentaerythritol diphosphite

Example 8

(1) Preparation of Propylene Polymer Composition 0.1 part by weight of bis(2,2,6,6-tetramethyl-4-piperidyl) sebacate (tradename LS 770, manufactured by Sankyo) as a light stabilisers, 0.05 part by weight of pentaerythrityl-tetrakis[3-(3,5-di-t-butyl-4-hydroxyphenyl)propionate], 0.05 part by weight of tris(2,4-di-t-butylphenyl) phosphite, and 0.05 part by weight of calcium stearate were added to 100 parts by weight of a propylene block copolymer (PP-1), followed by mixing by means of Super Mixer. The mixture was then melt-kneaded at 240° C. by means of a single screw extruder (screw diameter 30 mm) to prepare a composition in a pellet form.

(2) Forming of Test Sheet

The composition thus obtained was introduced into an injection molding machine having a mold temperature of 40° C. and a cylinder temperature of 240° C., and injection molded to prepare a test sheet (120 mm×80 mm×2 mm). The sheet thus obtained was evaluated for the weathering resistance (Xe-WOM, crack development time) and bleeding in the same manner as described above. The results are shown in Table 4.

Example 9

A composition was prepared in the same manner as in Example 8, except that 0.1 part by weight of a condensate of N,N-bis(3-aminopropyl)ethylenediamine with 2,4-bis[N-butyl-N-(1,2,2,6,6-pentamethyl-4-piperidyl)amino]-6-chloro-1,3,5-triazine (tradename CM 119 FL, manufactured by Ciba Specialty Chemicals, K.K.) was used as the light stabilisers instead of LS 770. The composition thus obtained was injection molded in the same manner as in Example 8 to prepare a test sheet which was then evaluated for the weathering resistance and bleeding. The results are shown in Table 4.

Example 10

A composition was prepared in the same manner as in Example 8, except that 0.2 part by weight of 2-(2-hydroxy-3-t-butyl-5-methyl-phenyl)-5-chlorobenzotriazole (tradename TNV 326, manufactured by Ciba Specialty Chemicals, K.K.) was used as the light stabilisers instead of LS 770. The composition thus obtained was injection molded in the same manner as in Example 8 to prepare a test sheet which was then evaluated for the weathering resistance and bleeding. The results are shown in Table 4.

Example 11

A composition was prepared in the same manner as in Example 8, except that 0.05 part by weight of LS 770 used in Example 8 and 0.05 part by weight of TNV 326 used in Example 10 were compounded as the light stabilisers. The composition thus obtained was injection molded in the same manner as in Example 8 to prepare a test sheet which was then evaluated for the weathering resistance and bleeding. The results are shown in Table 4.

Example 12

A composition was prepared in the same manner as in Example 8, except that 0.2 part by weight of 2-hydroxy-4-n-octoxybenzophenone (tradename SEESORB 102, manufactured by Shiraishi Calcium Kaisha Ltd.) was used as the light stabilisers instead of LS 770. The composition thus obtained was injection molded in the same manner as in Example 8 to prepare a test sheet which was then evaluated for the weathering resistance and bleeding. The results are shown in Table 4.

Example 13

A composition was prepared in the same manner as in Example 8, except that 0.2 part by weight of 2,4-di-t-butyl-phenyl-3,5-di-t-butyl-4-hydroxybenzoate (tradename Sumisorb 400, manufactured by Sumitomo Chemical Co., Ltd.) was used as the light stabilisers instead of LS 770. The composition thus obtained was injection molded in the same manner as in Example 8 to prepare a test sheet which was then evaluated for the weathering resistance and bleeding. The results are shown in Table 4.

Comparative Example 10

A composition was prepared in the same manner as in Example 8, except that no light stabilisers was compounded. The composition thus obtained was injection molded in the same manner as in Example 8 to prepare a test sheet which was then evaluated for the weathering resistance and bleeding. The results are shown in Table 5.

Comparative Example 11

A composition was prepared in the same manner as in Example 8, except that the block copolymer was changed to PP-5 prepared above. The composition thus obtained was injection molded in the same manner as in Example 8 to prepare a test sheet which was then evaluated for the weathering resistance and bleeding. The results are shown in Table 5.

Comparative Example 12

A composition was prepared in the same manner as in Example 8, except that, in Example 10, the block copolymer was changed to PP-5 prepared above. The composition thus obtained was injection molded in the same manner as in Example 8 to prepare a test sheet which was then evaluated for the weathering resistance and bleeding. The results are shown in Table 5.

Comparative Example 13

A composition was prepared in the same manner as in Example 8, except that, in Example 11, the block copolymer was changed to PP-5 prepared above. The composition thus obtained was injection molded in the same manner as in Example 8 to prepare a test sheet which was then evaluated for the weathering resistance and bleeding. The results are shown in Table 5.

Comparative Example 14

A composition was prepared in the same manner as in Example 8, except that, in Example 12, the block copolymer was changed to PP-5 prepared above. The composition thus obtained was injection molded in the same manner as in Example 8 to prepare a test sheet which was then evaluated for the weathering resistance and bleeding. The results are shown in Table 5.

Comparative Example 15

A composition was prepared in the same manner as in Example 8, except that, in Example 13, the block copolymer was changed to PP-5 prepared above. The composition thus obtained was injection molded in the same manner as in Example 8 to prepare a test sheet which was then evaluated for the weathering resistance and bleeding. The results are shown in Table 5.

TABLE 4

|  |  | Ex. 8 | Ex. 9 | Ex. 10 | Ex. 11 | Ex. 12 | Ex. 13 |
|---|---|---|---|---|---|---|---|
|  | Type of polymer | PP-1 | PP-1 | PP-1 | PP-1 | PP-1 | PP-1 |
| Compounding | E-1 | 0.1 | — | — | 0.05 | — | — |
| ingredients | E-2 | — | 0.1 | — | — | — | — |
|  | E-3 | — | — | 0.2 | 0.05 | — | — |
|  | E-4 | — | — | — | — | 0.2 | — |
|  | E-5 | — | — | — | — | — | 0.2 |

TABLE 4-continued

|  |  | Ex. 8 | Ex. 9 | Ex. 10 | Ex. 11 | Ex. 12 | Ex. 13 |
|---|---|---|---|---|---|---|---|
| Weathering resistance | Xe-WOM (Hr) (time necessary for causing cracking) | 3300 | 3000 | 2100 | 4600 | 1900 | 1800 |
|  | Bleeding | o- | o | o | o | o | o |

TABLE 5

|  |  | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|
|  | Type of polymer | PP-1 | PP-5 | PP-5 | PP-5 | PP-5 | PP-5 |
| Compounding ingredients | E-1 | — | 0.1 | — | 0.05 | — | — |
|  | E-2 | — | — | — | — | — | — |
|  | E-3 | — | — | 0.2 | 0.05 | — | — |
|  | E-4 | — | — | — | — | 0.2 | — |
|  | E-5 | — | — | — | — | — | 0.2 |
| Weathering resistance | Xe-WOM (Hr) (time necessary for causing cracking) | 500 | 2800 | 2000 | 3700 | 1500 | 1300 |
|  | Bleeding | o | x | o- | Δ | o- | o- |

In Tables 4 and 5, compounding ingredients E-1 to E-5 respectively represent the following compounds.

E-1: Bis(2,2,6,6-tetramethyl-4-piperidyl)sebacate

E-2: A condensate of N,N-bis(3-aminopropyl)-ethylenediamine with 2,4-bis[N-butyl-N-(1,2,2,6,6-penta-methyl-4-piperidyl)amino]-6-chloro-1,3,5-triazine E-3: 2-(2-Hydroxy-3-t-butyl-5-methyl-phenyl)-5-chlorobenzotriazole E-4: 2-Hydroxy-4-n-octoxybenzophenone E-5: 2,4-Di-t-butyl-phenyl-3,5-di-t-butyl-4-hydroxybenzoate Example 14

(1) Preparation of Propylene Resin Composition 0.4 part by weight of monoglyceride steatrate (tradename TS 5, manufactured by Kao Corp.) as an antistatic agent (AS agent), 0.05 part by weight of pentaerythrityl-tetrakis[3-(3, 5-di-t-butyl-4-hydroxyphenyl)propionate], 0.05 part by weight of tris(2,4-di-t-butylphenyl) phosphite, and 0.05 part by weight of calcium stearate were added to 100 parts by weight of a propylene block copolymer (PP-1) prepared in Production Example 1, followed by mixing by means of Super Mixer. The mixture was then melt-kneaded at 240° C. by means of a single screw extruder (screw diameter 30 mm) to prepare a composition in a pellet form.

(2) Molding of specimen

The composition thus obtained was introduced into an injection molding machine having a mold temperature of 40° C. and a cylinder temperature of 240° C., and injection molded into a test sheet for the evaluation of antistatic properties (100 mm×100 mm×1 mm).

Likewise, the composition prepared above was introduced into an injection molding machine having a mold temperature of 40° C. and a cylinder temperature of 240° C., and injection molded into a test sheet for the evaluation of bleeding (120 mm×80 mm×2 mm).

The sheets thus obtained were evaluated for antistatic properties (half-value period, percentage attenuation) and bleeding in the same manner as described above. The results are shown in Table 6.

Example 15

A composition was prepared in the same manner as in Example 14, except that 0.4 part by weight of a 1:1 mixture of monoglyceride laurate (0.2 part by weight) and diethanolamide laurate (0.2 part by weight) (tradename HS 12, manufactured by Kao Corp.) was used as the antistatic agent. The composition thus obtained was injection molded in the same manner as in Example 14 to prepare a test sheet which was then evaluated for antistatic properties and bleeding. The results are shown in Table 6.

Example 16

A composition was prepared in the same manner as in Example 14, except that 0.4 part by weight of diethanolamide laurate (tradename LA 2000 P, manufactured by Miyoshi Oil & Fat Co., Ltd.) was used as the antistatic agent. The composition thus obtained was injection molded in the same manner as in Example 14 to prepare a test sheet which was then evaluated for antistatic properties and bleeding. The results are shown in Table 6.

TABLE 6

|  |  | Ex. 14 | Ex. 15 | Ex. 16 | Comp. Ex. 16 | Comp. Ex. 17 | Comp. Ex. 18 | Comp. Ex. 19 |
|---|---|---|---|---|---|---|---|---|
|  | Type of polymer | PP-1 | PP-1 | PP-1 | PP-1 | PP-1 | PP-5 | PP-5 |
| Compounding ingredients | Monoglyceride stearate | 0.4 | — | — | — | — | 0.4 | — |
|  | Monoglyceride laurate | — | 0.2 | — | — | — | — | 0.2 |
|  | Diethanolamide laurate | — | 0.2 | 0.4 | — | — | — | 0.2 |
|  | Palmityl diethanolamine | — | — | — | 0.4 | — | — | — |

TABLE 6-continued

|  |  | Ex. 14 | Ex. 15 | Ex. 16 | Comp. Ex. 16 | Comp. Ex. 17 | Comp. Ex. 18 | Comp. Ex. 19 |
|---|---|---|---|---|---|---|---|---|
| AS properties | Half-value period | 5 | 10 | 15 | 40 | Not reduced to half value | 30 | 5 |
|  | Percentage attenuation | 100 | 90 | 85 | 70 | Not attenuated | 85 | 100 |
|  | Bleeding | ○- | ○ | ○ | ○ | ○ | Δ | Δ |

Comparative Example 16

A composition was prepared in the same manner as in Example 14, except that 0.4 part by weight of palmityldiethanolamine (tradename AMS 310, manufactured by Lion-Akzo Co., Ltd.) was compounded instead of monoglyceride stearate. The composition thus obtained was injection molded in the same manner as in Example 14 to prepare a test sheet which was then evaluated for antistatic properties and bleeding. The results are shown in Table 6.

Comparative Example 17

A composition was prepared in the same manner as in Example 14, except that no antistatic agent was compounded. The composition thus obtained was injection molded in the same manner as in Example 14 to prepare a test sheet which was then evaluated for antistatic properties. The results are shown in Table 6.

Comparative Example 18

A composition was prepared in the same manner as in Example 14, except that the block copolymer was changed to PP-5 prepared above. The composition thus obtained was injection molded in the same manner as in Example 14 to prepare a test sheet which was then evaluated for antistatic properties and bleeding. The results are shown in Table 6.

Comparative Example 19

A composition was prepared in the same manner as in Example 15, except that the block copolymer was changed to PP-5 prepared in Production Example 5. The composition thus obtained was injection molded in the same manner as in Example 15 to prepare a test sheet which was then evaluated for antistatic properties and bleeding. The results are shown in Table 6.

Examples 17 to 29 and Comparative Examples 20 to 32

(1) Preparation of Propylene Resin Composition

Propylene resin composition were prepared using propylene resins PP-1, PP-4, PP-5, PP-8, and PP-9 prepared respectively in Production Examples 1, 4, 5, 7, and 8. Various properties of PP-1 to PP-9 are shown in Table 1. For PP-7, a commercially available polypropylene (tradename "Novatec PP BC03HR"; Novatec being a registered trademark of Japan Polychem Corporation) was used.

Talc (average particle diameter: 2.7 μm) was used as an inorganic filler to be compounded with the propylene resins PP-1, PP-4, PP-5, PP-7, PP-8, and PP-9, and an ethylene-1-octene copolymer (MFR (230° C., load 2.16 kg): 12 g/10 min, 1-octene content: 24% by weight) was used as the elastomer. The glass fiber had an average fiber diameter of 10 μm, and has been surface treated with γ-aminopropyltriethoxysilane and an unsaturated carboxylic acid-modified polyolefin and urethane.

The unsaturated carboxylic acid-modified polypropylene (in the table, abbreviated to "modified PP") had a molecular weight of 150,000 and an acid modification of 1.20% (type of unsaturated carboxylic acid: maleic acid, type of polypropylene: homopolymer of propylene).

High density polyethylene (MFR (190° C., load 2.16 kg): 20 g/10 min, density 0.958 g/cm$^3$) was used as an optional component.

The compounding ingredients were compounded with these propylene resins according to formulations (% by weight) shown in Table 7 (Examples 17 to 21), Table 8 (Comparative Examples 20 to 24), Table 9 (Examples 22 to 25), Table 10 (Comparative Examples 25 to 28), Table 11 (Examples 26 to 29), and Table 12 (Comparative Examples 29 to 32), followed by kneading and granulation by means of a twin-screw extruder to prepare resin compositions in a pellet form.

(2) Molding of Specimen

The compositions thus obtained were introduced into an injection molding machine having a mold temperature of 40° C. and a cylinder temperature of 220° C., and then injection molded into specimens. For the injection molded specimens, the flexural modulus, the Izod impact strength, and the deflection temperature under load were measured by the methods described above. The results are shown in Tables 7 to 12.

TABLE 7

|  | Ex.17 | Ex.18 | Ex.19 | Ex.20 | Ex.21 |
|---|---|---|---|---|---|
| Propylene resin |  |  |  |  |  |
| PP-1 | — | 65 | — | — | 62 |
| PP-2 | — | — | — | — | — |
| PP-3 | — | — | — | — | — |
| PP-4 | 80 | — | 60 | 58 | — |
| PP-5 | — | — | — | — | — |
| PP-6 | — | — | — | — | — |
| PP-7 | — | — | — | — | — |
| PP-8 | — | — | 15 | — | — |
| PP-9 | — | — | — | 17 | — |
| Inorganic filler | 20 | 20 | 20 | 20 | 20 |
| Elastomer | — | 15 | 5 | 5 | 15 |
| Polyethylene | — | — | — | — | 3 |
| MFR, g/10 min | 28 | 23 | 26 | 32 | 22 |
| Flexural modulus, MPa | 2400 | 2350 | 2400 | 2400 | 2300 |
| Izod impact strength, kJ/m$^2$ | 25 | 35 | 38 | 37 | 39 |
| Deflection temp. under load, ° C. |  |  |  |  |  |
| 4.6 kgf/cm$^2$ | 133 | 132 | 132 | 131 | 130 |
| 18.5 kgf/cm$^2$ | 84 | 83 | 84 | 84 | 82 |

TABLE 8

|  | Comp. Ex.20 | Comp. Ex.21 | Comp. Ex.22 | Comp. Ex.23 | Comp. Ex.24 |
|---|---|---|---|---|---|
| Propylene resin |  |  |  |  |  |
| PP-1 | — | — | — | — | — |
| PP-2 | — | — | — | — | — |
| PP-3 | — | — | — | — | — |
| PP-4 | — | — | — | — | — |
| PP-5 | — | 65 | — | — | 62 |
| PP-6 | — | — | — | — | — |
| PP-7 | 80 | — | 60 | 58 | — |
| PP-8 | — | — | 15 | — | — |
| PP-9 | — | — | — | 17 | — |
| Inorganic filler | 20 | 20 | 20 | 20 | 20 |
| Elastomer | — | 15 | 5 | 5 | 15 |
| Polyethylene | — | — | — | — | 3 |
| MFR, g/10 min | 28 | 24 | 26 | 30 | 23 |
| Flexural modulus, MPa | 2350 | 2300 | 2400 | 2400 | 2250 |
| Izod impact strength, kJ/m$^2$ | 15 | 28 | 29 | 27 | 34 |
| Deflection temp. under load, °C |  |  |  |  |  |
| 4.6 kgf/cm$^2$ | 131 | 129 | 130 | 130 | 127 |
| 18.5 kgf/cm$^2$ | 78 | 77 | 78 | 78 | 75 |

TABLE 9

|  | Ex.22 | Ex.23 | Ex.24 | Ex.25 |
|---|---|---|---|---|
| Propylene resin |  |  |  |  |
| PP-1 | 95 | 73 | 65 | 92 |
| PP-2 | — | — | — | — |
| PP-3 | — | — | — | — |
| PP-4 | — | — | — | — |
| PP-5 | — | — | — | — |
| PP-6 | — | — | — | — |
| PP-7 | — | — | — | — |
| PP-8 | — | 20 | — | — |
| PP-9 | — | — | 30 | — |
| Elastomer | 5 | 7 | 5 | 5 |
| Polyethylene | — | — | — | 3 |
| MFR, g/10 min | 28 | 26 | 35 | 27 |
| Flexural modulus, MPa | 1300 | 1350 | 1350 | 1250 |
| Izod impact strength, kJ/m$^2$ | 9.1 | 9.5 | 8.9 | 10.3 |
| Deflection temp. under load, °C |  |  |  |  |
| 4.6 kgf/cm$^2$ | 125 | 124 | 124 | 123 |
| 18.5 kgf/cm$^2$ | 79 | 79 | 78 | 77 |

TABLE 10

|  | Comp. Ex.25 | Comp. Ex.26 | Comp. Ex.27 | Comp. Ex.28 |
|---|---|---|---|---|
| Propylene resin |  |  |  |  |
| PP-1 | — | — | — | — |
| PP-2 | — | — | — | — |
| PP-3 | — | — | — | — |
| PP-4 | — | — | — | — |
| PP-5 | 95 | 73 | 65 | 92 |
| PP-6 | — | — | — | — |
| PP-7 | — | — | — | — |
| PP-8 | — | 20 | — | — |
| PP-9 | — | — | 30 | — |
| Elastomer | 5 | 7 | 5 | 5 |
| Polyethylene | — | — | — | 3 |
| MFR, g/10 min | 27 | 27 | 33 | 27 |
| Flexural modulus, MPa | 1300 | 1250 | 1300 | 1250 |
| Izod impact strength, kJ/m$^2$ | 7.0 | 7.5 | 7.1 | 7.7 |
| Deflection temp. under load, °C |  |  |  |  |
| 4.6 kgf/cm$^2$ | 123 | 122 | 122 | 120 |
| 18.5 kgf/cm$^2$ | 74 | 73 | 73 | 71 |

TABLE 11

|  | Ex.26 | Ex.27 | Ex.28 | Ex.29 |
|---|---|---|---|---|
| Propylene resin |  |  |  |  |
| PP-1 | 79 | 74 | 54 | 51 |
| PP-2 | — | — | — | — |
| PP-3 | — | — | — | — |
| PP-4 | — | — | — | — |
| PP-5 | — | — | — | — |
| PP-6 | — | — | — | — |
| PP-7 | — | — | — | — |
| PP-8 | — | — | — | — |
| PP-9 | — | — | 25 | 23 |
| Glass fiber | 20 | 20 | 20 | 20 |
| Modified PP | 1 | 1 | 1 | 1 |
| Elastomer | — | 5 | — | 5 |
| MFR, g/10 min | 7.1 | 6.4 | 9.3 | 8.8 |
| Flexural modulus, MPa | 3850 | 3450 | 3900 | 3400 |
| Izod impact strength, kJ/m$^2$ | 11.3 | 12.5 | 12.0 | 13.2 |
| Deflection temp. under load, °C |  |  |  |  |
| 18.5 kgf/cm$^2$ | 153 | 151 | 152 | 151 |

TABLE 12

|  | Comp. Ex.29 | Comp. Ex.30 | Comp. Ex.31 | Comp. Ex.32 |
|---|---|---|---|---|
| Propylene resin |  |  |  |  |
| PP-1 | 80 | 75 | 55 | 52 |
| PP-2 | — | — | — | — |
| PP-3 | — | — | — | — |
| PP-4 | — | — | — | — |
| PP-5 | — | — | — | — |
| PP-6 | — | — | — | — |
| PP-7 | — | — | — | — |
| PP-8 | — | — | — | — |
| PP-9 | — | — | 25 | 23 |
| Glass fiber | 20 | 20 | 20 | 20 |
| Modified PP | — | — | — | — |
| Elastomer | — | 5 | — | 5 |
| MFR, g/10 min | 7.0 | 5.5 | 8.9 | 8.6 |
| Flexural modulus, MPa | 3800 | 3450 | 3900 | 3400 |
| Izod impact strength, kJ/m$^2$ | 6.8 | 8.1 | 7.8 | 8.8 |
| Deflection temp. under load, °C |  |  |  |  |
| 18.5 kgf/cm$^2$ | 127 | 125 | 125 | 126 |

TABLE 13

|  | PP-10 | PP-11 | PP-12 |
|---|---|---|---|
| Type of catalyst | Metallocene | Ziegler | Ziegler |
| Comonomer content, mol % | 0 | 0 | 0 |
| MFR, g/10 min | 30 | 29.7 | 30.6 |
| mmmm, % | 99.2 | 98.0 | 99.2 |
| 1,3-Regioirregular bond, % | 0.5 | <0.02 | <0.02 |

TABLE 13-continued

|  | PP-10 | PP-11 | PP-12 |
|---|---|---|---|
| Average elution temp., $T_{50}$: °C. | 97 | 116 | 119 |
| Elution dispersion, σ | 7.3 | 14.3 | 9.8 |

Examples 30 to 33 and Comparative Examples 33 to 36

(1) Preparation of Propylene Resin Composition

Propylene resin compositions were prepared using propylene resins PP-10 to PP-12 prepared respectively in Production Examples 9 to 11. Various properties of PP-10 to PP-12 are shown in Table 13.

Talc (average particle diameter: 2.7 μm) was used as an inorganic filler to be compounded with the propylene resins PP-10 to PP-12, and an ethylene-1-octene copolymer (MFR (230° C., load 2.16 kg): 12 g/10 min, 1-octene content: 24% by weight) was used as the elastomer. The glass fiber had an average fiber diameter of 10 μm, and has been surface treated with γ-aminopropyltriethoxysilane and an unsaturated carboxylic acid-modified polyolefin and urethane.

The unsaturated carboxylic acid-modified polypropylene (in the table, abbreviated to "emodified PP") had a molecular weight of 150,000 and an acid modification of 1.20% (type of unsaturated carboxylic acid: maleic acid, type of polypropylene: homopolymer of propylene).

High density polyethylene (MFR (190° C., load 2.16 kg): 20 g/10 min, density 0.958 g/cm³) was used as an optional component.

The compounding ingredients were compounded with these propylene resins according to formulations (% by weight) shown in Table 14 (Examples 30 to 33 and Comparative Examples 33 to 36), followed by kneading and granulation by means of a twin screw extruder to prepare resin compositions in a pellet form.

(2) Molding of Specimen

The compositions thus obtained were introduced into an injection molding machine having a mold temperature of 40° C. and a cylinder temperature of 220° C., and then injection molded into specimens. For the injection molded specimens, the flexural modulus, the Izod impact strength, and the deflection temperature under load were measured by the methods described above. The results are shown in Table 14.

TABLE 14

|  | Ex. 30 | Ex. 31 | Comp. Ex. 33 | Comp. Ex. 34 | Ex. 32 | Comp. Ex. 35 | Ex. 33 | Comp. Ex. 36 |
|---|---|---|---|---|---|---|---|---|
| Propylene polymer |  |  |  |  |  |  |  |  |
| PP-10 | 80 | 60 | — | — | 90 | — | 79 | 80 |
| PP-11 | — | — | 80 | 60 | — | 90 | — | — |
| PP-12 | — | 20 | — | 20 | — | — | — | — |
| Inorganic filler | 20 | 20 | 20 | 20 | — | — | — | — |
| Elastomer | — | — | — | — | 10 | 10 | — | — |
| Glass fiber | — | — | — | — | — | — | 20 | 20 |
| Modified PP | — | — | — | — | — | — | 1 | — |
| MFR, g/10 min | 29 | 29 | 28 | 30 | 18 | 17 | 6.3 | 6.1 |
| Flexural modulus, MPa | 3250 | 3300 | 3300 | 3350 | 1400 | 1350 | 4000 | 3950 |
| Izod impact strength, kJ/m² | 2.0 | 1.8 | 2.0 | 1.7 | 6.3 | 6.2 | 10.0 | 6.5 |
| Deflection temp. under load, °C. |  |  |  |  |  |  |  |  |
| 4.6 kgf/cm² | 140 | 140 | 138 | 139 | 127 | 124 | — | — |
| 18.5 kgf/cm² | 105 | 104 | 100 | 100 | 81 | 75 | 154 | 129 |

As is apparent from the results of the examples, the propylene block copolymers having a specific structure according to the present invention and the propylene polymer compositions comprising specific additives compounded with the propylene block copolymers have an excellent balance between rigidity and warpage properties and excellent resistance to deterioration caused by thermal oxidation during processing, weathering resistance, antistatic properties, and low bleeding. The propylene resin compositions comprising a propylene block copolymer having a specific structure and, compounded therewith, a specific component (an inorganic filler, an elastomer or the like) according to the present invention has an excellent balance between mechanical strength properties (particularly an excellent balance among rigidity, low-temperature impact resistance, and heat resistance). These are commercially very useful as molding materials for injection molding, extrusion and the like. Further, the propylene resin compositions comprising a propylene polymer having a specific structure and, compounded therewith, a specific component (an inorganic filler, an elastomer or the like) according to the present invention has an excellent balance between mechanical strength properties (particularly an excellent balance between rigidity and heat resistance). These are commercially very useful as molding materials for injection molding, extrusion and the like.

What is claimed is:

1. A propylene block copolymer consisting essentially of the following blocks (a) and (b) and having a melt flow rate of 0.1 to 200 g/10 min:

block (a): a polymer block of a homopolymer of propylene or a random copolymer of propylene with a comonomer selected from the group consisting of ethylene and $C_4$–$C_{20}$ α-olefins, the content of the comonomer being not more than 10% by mole, wherein, the isotactic pentad chain fraction of block (a) is not less than 95%; and block (b): a polymer block of a random copolymer of propylene with at least one comonomer selected from the group consisting of ethylene and $C_4$-$C_{20}$ α-olefins, the content of the comonomer being 10 to 80% by mole, the average chain length of the comonomer block and the gross average chain length of the comonomer having a relationship represented by formula (I)

$$n_b < n+1.5 \qquad (I)$$

wherein $n_b$ represents the average chain length of the comonomer block; n represents the gross average chain length of the comonomer; and wherein the ratio by weight of block (a) to block (b) in the block copolymer is 50:50 to 95:5.

2. The propylene block copolymer according to claim 1, wherein the melt flow rate is 4 to 200 g/10 min.

3. The propylene block copolymer according to claim 1, wherein block (b) has a melt flow rate of 0.01 to 3 g/10 min.

4. The propylene polymer composition according to claim 1, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

5. A propylene resin composition comprising: (1) the propylene block copolymer according to claim 1 and (2) an inorganic filler, wherein the propylene block copolymer content is from 20 to 99% by weight, and the inorganic filler content is from 1 to 80% by weight.

6. The propylene resin composition according to claim 5 further comprising (3) an elastomer, wherein the propylene block copolymer content is from 49 to 94% by weight, the inorganic filler content is from 5 to 50% by weight, and the elastomer content is from 1 to 40% by weight.

7. The propylene resin composition according to claim 6, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

8. The propylene resin composition according to claim 6, wherein the propylene block copolymer has a melt flow rate of 4 to 200 g/10 min.

9. A molded product of a propylene resin, selected from the group consisting of injection molded products, blow molded products, and extruded products, said molded product comprising the propylene resin composition according to claim 6.

10. The propylene resin composition according to claim 5 further comprising (4) a polypropylene resin produced in the presence of a Ziegler catalyst, wherein the propylene block copolymer content is from 40 to 85% by weight, the inorganic filler content is from 5 to 50% by weight, and the Ziegler polypropylene content is from 10 to 50% by weight.

11. The propylene resin composition according to claim 10, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

12. The propylene resin composition according to claim 10, wherein the propylene block copolymer has a melt flow rate of 4 to 200 g/10 min.

13. A molded product of a propylene resin, selected from the group consisting of injection molded products, blow molded products, and extruded products, said molded product comprising the propylene resin composition according to claim 10.

14. The propylene resin composition according to claim 5 further comprising (3) an elastomer and (4) a polypropylene resin produced in the presence of a Ziegler catalyst, wherein the propylene block copolymer content is from 39 to 84% by weight, the inorganic filler content is from 5 to 50% by weight, the elastomer content is from 1 to 40% by weight, and the Ziegler polypropylene content is from 10 to 50% by weight.

15. The propylene resin composition according to claim 14, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

16. The propylene resin composition according to claim 14, wherein the propylene block copolymer has a melt flow rate of 4 to 200 g/10 min.

17. A molded product of a propylene resin, selected from the group consisting of injection molded products, blow molded products, and extruded products, said molded product comprising the propylene resin composition according to claim 14.

18. The propylene resin composition according to claim 5, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

19. The propylene resin composition according to claim 5, wherein the propylene block copolymer has a melt flow rate of 4 to 200 g/10 min.

20. A molded product of a propylene resin, selected from the group consisting of injection molded products, blow molded products, and extruded products, said molded product comprising the propylene resin composition according to claim 5.

21. A propylene resin composition comprising: (1) the propylene block copolymer according to claim 1 and (2) an elastomer, wherein the propylene block copolymer content is from 60 to 99% by weight, and the elastomer content is from 1 to 40% by weight.

22. The propylene resin composition according to claim 21, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

23. The propylene resin composition according to claim 21, wherein the propylene block copolymer has a melt flow rate of 4 to 200 g/10 min.

24. A molded product of a propylene resin, selected from the group consisting of injection molded products, blow molded products, and extruded products, said molded product comprising the propylene resin composition according to claim 21.

25. A propylene resin composition which comprises (1) the propylene block copolymer according to claim 1, (2) an elastomer, (3) a polypropylene resin produced in the presence of a Ziegler catalyst, wherein the propylene block copolymer content is from 49 to 84% by weight, the elastomer content is from 1 to 40% by weight, and the Ziegler polypropylene content is from 10 to 50% by weight.

26. The propylene resin composition according to claim 25, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

27. The propylene resin composition according to claim 25, wherein the propylene block copolymer has a melt flow rate of 4 to 200 g/10 min.

28. A molded product of a propylene resin, selected from the group consisting of injection molded products, blow molded products, and extruded products, said molded product comprising the propylene resin composition according to claim 25.

29. A propylene resin composition comprising: (1) the propylene block copolymer according to claim 1, (2) a glass fiber; and (3) an unsaturated carboxylic acid-modified polypropylene, wherein the propylene block copolymer content is from 40 to 98% by weight, the glass fiber content is from 1 to 50% by weight, and the unsaturated carboxylic acid-modified polypropylene content is from 0.1 to 10% by weight.

30. The propylene resin composition according to claim 29, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

31. The propylene resin composition according to claim 29, wherein the propylene block copolymer has a melt flow rate of 4 to 200 g/10 min.

32. A molded product of a propylene resin, selected from the group consisting of injection molded products, blow molded products, and extruded products, said molded product comprising the propylene resin composition according to claim 29.

33. The propylene resin composition according to claim 29 further comprising (4) an elastomer, wherein the propylene block copolymer content is from 58 to 97% by weight, the glass fiber content is from 1 to 40% by weight, the unsaturated carboxylic acid-modified polypropylene content is from 0.3 to 5% by weight, and the elastomer content is from 1 to 40% by weight.

34. The propylene resin composition according to claim 33, the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

35. The propylene resin composition according to claim 33, wherein the propylene block copolymer has a melt flow rate of 4 to 200 g/10 min.

36. A molded product of a propylene resin, selected from the group consisting of injection molded products, blow molded products, and extruded products, said molded product comprising the propylene resin composition according to claim 33.

37. The propylene resin composition according to claim 29 further comprising (5) a polypropylene resin produced in the presence of a Ziegler catalyst, wherein the propylene block copolymer content is from 48 to 88% by weight, the glass fiber content is from 1 to 40% by weight, the unsaturated carboxylic acid-modified polypropylene content is from 0.3 to 5% by weight, and the Ziegler polypropylene content is from 10 to 50% by weight.

38. The propylene resin composition according to claim 37, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

39. The propylene resin composition according to claim 37, wherein the propylene block copolymer has a melt flow rate of 4 to 200 g/10 min.

40. A molded product of a propylene resin, selected from the group consisting of injection molded products, blow molded products, and extruded products, said molded product comprising the propylene resin composition according to claim 37.

41. The propylene resin composition according to claim 29 further comprising (4) an elastomer and (5) a polypropylene resin produced in the presence of a Ziegler catalyst, wherein the propylene block copolymer content is from 47 to 87% by weight, the glass fiber content is from 1 to 40% by weight, the unsaturated carboxylic acid-modified polypropylene content is from 0.3 to 5% by weight, the elastomer content is from 1 to 40% by weight, and the Ziegler polypropylene content is from 10 to 50% by weight.

42. The propylene resin composition according to claim 41, wherein the block (a) has a weight average molecular weight (Mw) of 10,000 to 1,000,000, a ratio of the weight average molecular weight (Mw) to the number average molecular weight (Mn), Mw/Mn, of not more than 6, and a 1,3-regioirregular content of 0.02 to 3% by mole.

43. The propylene resin composition according to claim 41, wherein the propylene block copolymer has a melt flow rate of 4 to 200 g/10 min.

44. A molded product of a propylene resin, selected from the group consisting of injection molded products, blow molded products, and extruded products, said molded product comprising the propylene resin composition according to claim 41.

45. A propylene block copolymer consisting essentially of the following blocks (a) and (b) and having a melt flow rate of 0.1 to 200 g/10 min:

block (a): a polymer block of a homopolymer of propylene or a random copolymer of propylene with a comonomer selected from the group consisting of ethylene and $C_4$–$C_{20}$ α-olefins, the content of the comonomer being not more than 10% by mole, wherein, the isotactic pentad chain fraction of block (a) is not less than 95%; and block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (II)

$$n_b < n+1.2 \qquad \text{(II)}$$

wherein $n_b$ represents the average chain length of the comonomer block; n represents the gross average chain length of the comonomer; and wherein the ratio by weight of block (a) to block (b) in the block copolymer is 50:50 to 95:5.

46. A propylene polymer composition comprising:
   100 parts by weight of a propylene block copolymer consisting essentially of the following blocks (a) and (b) and having a melt flow rate of 0.1 to 200 g/10 min; and
   0.001 to 1 part by weight of at least one metal salt selected from the group consisting of 1) metal salts of aromatic phosphoric acids and 2) metal salts of aromatic or alicyclic carboxylic acids:

block (a): a polymer block of a homopolymer of propylene or a random copolymer of propylene with a comonomer selected from the group consisting of ethylene and $C_4$–$C_{20}$ α-olefins, the content of the comonomer being not more than 10% by mole; and wherein the ratio by weight of block (a) to block (b) in the block copolymer is 50:50 to 95:5; and block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (I)

$$n_b < n+1.5 \qquad (I)$$

wherein $n_b$ represents the average chain length of the comonomer block; n represents the gross average chain length of the comonomer.

47. The propylene polymer composition according to claim 46, wherein the propylene block copolymer has a melt flow rate of 4 to 200 g/10 min.

48. A molded product of a propylene resin, selected from the group consisting of injection molded products, blow molded products, and extruded products, said molded product comprising the propylene resin composition according to claim 46.

49. A propylene polymer composition comprising:
  100 parts by weight of a propylene block copolymer consisting essentially of the following blocks (a) and (b) and having a melt flow rate of 0.1 to 200 g/10 min; and
  0.001 to 1 part by weight of at least one compound selected from the group consisting of 3) aromatic phosphoric ester compounds having a melting point of 50° C. or greater and 4) hindered phenolic compounds:
  block (a): a polymer block of a homopolymer of propylene or a random copolymer of propylene with a comonomer selected from the group consisting of ethylene and $C_4$–$C_{20}$ α-olefins, the content of the comonomer being not more than 10% by mole; and wherein the ratio by weight of block (a) to block (b) in the block copolymer is 50:50 to 95:5; and
  block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (I)

$$n_b < n+1.5 \qquad (I)$$

wherein $n_b$ represents the average chain length of the comonomer block; n represents the gross average chain length of the comonomer.

50. The propylene polymer composition according to claim 49, wherein the propylene block copolymer has a melt flow rate of 4 to 200 g/10 min.

51. A propylene polymer composition comprising:
  100 parts by weight of a propylene block copolymer consisting essentially of the following blocks (a) and (b) and having a melt flow rate of 0.1 to 200 g/10 min; and
  0.001 to 1 part by weight of at least one compound selected from the group consisting of 5) hindered amine compounds, 6) triazole compounds, 7) benzophenone compounds, and 8) benzoate compounds:
  block (a): a polymer block of a homopolymer of propylene or a random copolymer of propylene with a comonomer selected from the group consisting of ethylene and $C_4$–$C_{20}$ α-olefins, the content of the comonomer being not more than 10% by mole; and wherein the ratio by weight of block (a) to block (b) in the block copolymer is 50:50 to 95:5; and
  block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (I)

$$n_b < n+1.5 \qquad (I)$$

wherein $n_b$ represents the average chain length of the comonomer block; n represents the gross average chain length of the comonomer.

52. The propylene polymer composition according to claim 51, wherein the propylene block copolymer has a melt flow rate of 4 to 200 g/10 min.

53. A propylene polymer composition comprising:
  100 parts by weight of a propylene block copolymer consisting essentially of the following blocks (a) and (b) and having a melt flow rate of 0.1 to 200 g/10 min; and
  0.001 to 1 part by weight of at least one compound selected from the group consisting of 9) fatty acid glycerol esters and 10) fatty acid diethanol amide compounds:
  block (a): a polymer block of a homopolymer of propylene or a random copolymer of propylene with a comonomer selected from the group consisting of ethylene and $C_4$–$C_{20}$ α-olefins, the content of the comonomer being not more than 10% by mole; and wherein the ratio by weight of block (a) to block (b) in the block copolymer is 50:50 to 95:5; and
  block (b): a polymer block of a random copolymer of propylene with at least one comonomer selected from the group consisting of ethylene and $C_4$–$C_{20}$ α-olefins, the content of the comonomer being 10 to 80% by mole, the average chain length of the comonomer block and the gross average chain length of the comonomer having a relationship represented by formula (I)

$$n_b < n+1.5 \qquad (I)$$

wherein $n_b$ represents the average chain length of the comonomer block; n represents the gross average chain length of the comonomer.

54. The propylene polymer composition according to claim 53, wherein the propylene block copolymer has a melt flow rate of 4 to 200 g/10 min.

* * * * *

UNITED STATES PATENT AND TRADEMARK OFFICE
CERTIFICATE OF CORRECTION

PATENT NO. : 6,825,280 B1
DATED : November 30, 2004
INVENTOR(S) : Yuu Hayakawa et al.

It is certified that error appears in the above-identified patent and that said Letters Patent is hereby corrected as shown below:

Column 63,
Line 11, "nb < n + 1.5 • • • (I)" should read -- nb ≤ n + 1.5 • • • (I) --

Column 66,
Line 51, "nb < n + 1.2 • • • (II)" should read -- nb ≤ n + 1.2 • • • (II) --

Column 67,
Lines 15 and 51, "nb < n + 1.5 • • • (I)" should read -- nb ≤ n + 1.5 • • • (I) --

Column 68,
Lines 21 and 53, "nb < n + 1.5 • • • (I)" should read -- nb ≤ n + 1.5 • • • (I) --

Signed and Sealed this

First Day of March, 2005

JON W. DUDAS
*Director of the United States Patent and Trademark Office*